(12) United States Patent
Fujiwara et al.

(10) Patent No.: US 6,383,558 B1
(45) Date of Patent: May 7, 2002

(54) METHOD FOR FORMING MONOLAYER POWDER FILM

(75) Inventors: Akira Fujiwara; Shuji Mitani; Chikara Murata, all of Shizuoka (JP)

(73) Assignee: Tomoegawa Paper Co., Ltd., Tokyo (JP)

( * ) Notice: Subject to any disclaimer, the term of this patent is extended or adjusted under 35 U.S.C. 154(b) by 0 days.

(21) Appl. No.: 09/614,906

(22) Filed: Jul. 12, 2000

(30) Foreign Application Priority Data

Jul. 15, 1999 (JP) .......................................... 11-202263
Sep. 27, 1999 (JP) .......................................... 11-272969

(51) Int. Cl.⁷ .............................. B05D 1/12; B05D 3/12
(52) U.S. Cl. ...................... 427/164; 427/180; 427/202; 427/355
(58) Field of Search ................................. 427/162, 164, 427/180, 184, 185, 202, 242, 421, 427, 355, 369

(56) References Cited

U.S. PATENT DOCUMENTS 5,167,989 A * 12/1992 Dudek et al.
5,505,990 A * 4/1996 Sagawa et al.

FOREIGN PATENT DOCUMENTS

| JP | A-5-302176 | 11/1993 |
| JP | A-9-318801 | 12/1997 |
| JP | 9 318801 A | * 12/1997 |
| JP | A-11-95004 | 4/1999 |

* cited by examiner

Primary Examiner—Fred J. Parker
(74) Attorney, Agent, or Firm—Arent, Fox, Kintner, Plotkin & Kahn

(57) ABSTRACT

A coating method for uniformly forming a monolayer powder film on a base material, even if fine powders having a volume average particle diameter of 15 μm or less are employed is disclosed. An adhesive layer consisting of an adhesive having a weight average molecular weight of 250,000 or more is formed on a base material, powders are adhered on the adhesive layer, the powders are embedded in a surface of the adhesive layer by impacts of granular pressure media, adhered surplus powders are removed from this laminate, and a monolayer powder film consisting of a large amount of powders embedded as a monolayer, so that part thereof protrudes from the adhesive layer, is thereby formed on a surface of the adhesive layer.

15 Claims, 14 Drawing Sheets

Photomicrograph of Plane View of
Powder Film of Sample 1 (2,000×)

Photomicrograph of Cross View of
Powder Film of Sample 1 (2,000×)

Photomicrograph of Plane View of
Powder Film of Sample 2 (2,000×)

Photomicrograph of Cross View of
Powder Film of Sample 2 (2,000×)

Photomicrograph of Plane View of
Powder Film of Sample 3 (1,000×)

Photomicrograph of Cross View of
Powder Film of Sample 3 (1,000×)

Photomicrograph of Plane View of Powder Film of Sample 4 (1,000 ×)

Photomicrograph of Cross View of Powder Film of Sample 4 (1,000 ×)

Photomicrograph of Plane View of
Powder Film of Sample 5 (2,000 ×)

Photomicrograph of Cross View of
Powder Film of Sample 5 (2,000 ×)

Photomicrograph of Plane View of
Powder Film of Sample 6 (150×)

Photomicrograph of Plane View of
Powder Film of Sample 6 (1,500×)

Photomicrograph of Plane View of
Powder Film of Sample 6 (1,500 ×)

Photomicrograph of Cross View of
Powder Film of Sample 6 (2,000 ×)

Photomicrograph of Plane View of Powder Film of Sample 7 (1,000×)

Photomicrograph of Plane View of Powder Film of Sample 7 (2,000×)

Photomicrograph of Plane View of Powder Film of Sample 7 (5,000×)

Photomicrograph of Cross View of
Powder Film of Sample 7 (2,000 ×)

Photomicrograph of Cross View of
Powder Film of Sample 7 (5,000 ×)

Photomicrograph of Plane View of
Powder Film of Sample 8 (1,000×)

Photomicrograph of Plane View of
Powder Film of Sample 8 (2,000×)

Photomicrograph of Plane View of
Powder Film of Sample 8 (5,000×)

Photomicrograph of Cross View of
Powder Film of Sample 8 (2,000×)

Photomicrograph of Cross View of
Powder Film of Sample 8 (5,000×)

Transmitting Light from Film Side

Total Light Diffusion Transmittance

Total Light Diffusion Reflectance

METHOD FOR FORMING MONOLAYER POWDER FILM

BACKGROUND OF THE INVENTION

The present invention relates to a method for forming a monolayer powder film by embedding powders in an adhesive layer consisting of acrylic type adhesive previously formed on the surface of a base material, so that part of the powder is exposed. Additionally, the present invention relates to a production method for a filler lens which is suitable for use in displays such as LCDs, ELs, FEDs, etc., and which in particular, yields superior effects in which nonuniformity of luminance in these displays is avoided and contrast therein is improved.

As a general conventional method in which powders are adhered to a base material, (1) flowing and soaking methods in which powders are sprayed on a base material preheated to above the melting point of the powder and are adhered by melting; (2) electrostatic spray method in which powders are charged and sprayed on a base material by air spraying; (3) electrostatic flowing and soaking method in which a base material is soaked in a powder coating material fluidized by charged air and powders are adhered to the base material by electrostatic attraction; and (4) electrodeposition method in which charged powders are dispersed into solution and are supported on a base material by applying voltage; etc., can be used.

As a powder coating method proposed in Japanese Patent Application Publications, etc., (5) a method in which an adhesive layer consisting of uncured resin is previously formed on the surface of a base material, powder coating materials adhered to the surface of film forming media are embedded in the adhesive layer by using external force such as vibration, procedures in which powders are further embedded in the adhesive pushed out on the surface in the above embedding procedure by the film forming media are repeated, and then a powder film is completely formed at which pushing out of the adhesive is stopped, is disclosed in Japanese Unexamined Patent Publication No. 5-302176. In addition, (6) methods in which an adhesive layer is formed on a base material, transparent microspheres are placed on the adhesive layer, the surface thereof is leveled by skizing, and then the transparent microspheres are embedded in the adhesive layer by presses, pressure rollers, etc., are disclosed in Japanese Unexamined Patent Publications No. 9-318801 and No. 11-95004.

However, film forming methods of the above (1) to (4) are methods for adhering powders on the surface of a base material in multilayers, and the methods theoretically cannot form a monolayer powder film in which powders are uniformly filled in the planar direction at high density.

In contrast, according to the coating method (5), since uncured liquid resin is used as an adhesive layer, the adhesive oozes from spaces and is adhered to the powders and a powder adhered layer is formed as a multilayer. In addition, in this coating method, if the film forming media and the base material are not vibrated or stirred at the same time, the film forming media adhere to the surface of the adhesive layer. Therefore, it was unsuitable for coating base materials having a large area such as film or sheet materials.

Furthermore, in the coating method (6), filling density of the powders in the planar direction is often not uniform, and dense regions and sparse regions of the powders in filling density are easily formed. In addition, in this method, it was also difficult to embed the powders to a uniform depth in the adhesive layer. That is, pressure differences partially occur, depending on partial bending of pressure rollers or presses, dispersion of thicknesses in an adhesive layer, dispersion of thicknesses in a film, etc. At a place at which a large pressure is applied, an adhesive layer is easily formed as a multilayer because powders are deeply embedded, adhesive oozes from openings adhered to the powders, and other powders are adhered thereon. In contrast, at a place at which a slight pressure is applied, defects such as powder coming out easily occur in washing processes for surplus powder, etc., because powders have not been sufficiently embedded in the adhesive layer. This phenomenon is pronounced in the case in which a large area is coated or in the case in which the volume average particle diameter of powders to be used is 15 $\mu$m or less. In particular, in the case in which the volume average particle diameter of powders to be used is 15 $\mu$m or less, since the specific surface area of the powders is increased and the fluidity of the powders is substantially deteriorated by effects of interparticle forces such as van der Waals forces, electrostatic attraction such as frictional electrostatic charging, etc., it was difficult for powders to be adhered uniformly to the surface of the adhesive layer at high densities. Furthermore, if powders in which volume average particle diameter is 15 $\mu$m or less are used, since the pressure from pressure rollers disperses and the pressure applied to each powder is lowered, other powders cannot be embedded to uniform depth in spaces between the powder particles already adhered on the adhesive layer. Therefore, the filling density of the powders is low, and dispersion of embedding depths of the powders in the adhesive layer is also increased by the above partial dispersion of pressure.

Additionally, there has been remarkable progress in displays such as LCDs, ELs, FEDs, etc., recently. In particular, the LCD has spread through numerous fields such as notebook-size personal computers, portable type terminals, etc., and this is anticipated to continue in the future. LCDs may be divided into reflecting types and transmitting types, depending on the manner in which illuminating light is taken into the liquid crystal panel. The reflecting type uses a method in which a reflecting plate on which an aluminum film, etc., is adhered having a high reflectivity is arranged in the back of a liquid crystal panel; external light transmitted from a surface side of the display is reflected by the reflecting plate; the liquid crystal panel is illuminated; and a liquid crystal image is obtained. In contrast, the transmitting type uses a method in which a liquid crystal panel is illuminated by a back light unit arranged in the back of the liquid crystal panel. In the reflecting type, in order to prevent loss of contrast in which the native color of the aluminum appears, the background color is made to closely resemble paper white color by inserting a medium which moderately diffuses the light between the liquid crystal panel and the reflecting plate. In addition, the back light unit in the transmitting type is generally provided with a light source such as an acrylic light conducting board having a cold cathode tube and a light diffusing board diffusing light from the light source, and is a composition in which uniform planar light illuminates the liquid crystal panel.

Thus, in either of the methods used in the reflecting type and transmitting type, a medium having a light diffusivity (hereinafter referred to as "light diffusion material") is used. As this light diffusion material, for example, a material in which adhesive resin dispersed fillers having light diffusivity is laminated on one surface of a transparent resin film, can be employed. Such conventional light diffusion materials have been produced by a method in which a coating material is prepared by dispersing fillers in a solution dissolved solvent in adhesive resin, and this coating material is coated on a film by a spray or a coater. In FIG. 17, a light diffusion material obtained by such a production method is schematically shown, and an adhesive layer 22 is formed on a film 21 by curing adhesive resin solution and fillers 23 are dispersed in this adhesive layer 22.

With respect to total light diffusion transmittance and total light diffusion reflectance in the above conventional light diffusion material, these values in a direction of incident light in which light is transmitted from a filler side are almost similar to these values in a direction from a film side, and these show equal values. It is found that light diffusivity is the same regardless of the incidence direction of the light, that is, there is no directivity. This is the reason that fillers are perfectly embedded in an adhesive layer, fillers overlap in a thickness direction, and a multilayer is thereby formed; the surface shape of the light diffusion material becomes a relatively symmetrical sine curve when filling density of fillers is coarse; etc.

Therefore, the inventors have conducted various research in order to produce a filler lens in which fillers are embedded so that part of the filler protrudes on the surface of an adhesive layer and in which protruding filler serves as a fine lens, and have developed a method for embedding fillers in an adhesive layer by striking to fillers using external force via pressure media, so that production of a filler lens which exhibits light diffusivity having a directivity was attained.

However, according to the above filler lens, since the adhesive of the adhesive layer maintains a condition having flexibility in the case of embedding fillers, the embedding condition of the fillers changed due to the thermal fluidity of the adhesive, in particular under high-temperatures and high-humidity, and it was difficult for reliable optical properties, that is, specific optical properties, to be maintained.

SUMMARY OF THE INVENTION

It is an object of the present invention to provide a coating method in which a monolayer powder film is uniformly formed on a base material, even if fine powders as described above are employed having a volume average particle diameter of 15 $\mu$m or less with which it was difficult to produce films by conventional coating methods. A "monolayer powder film" according to the present invention refers to a film formed in order to give various functions such as polishing, non-slipping or slipping, light-reflecting or anti-reflecting, insulating or conducting, light condensing or diffusing using in a flat lens, a translucent screen, polarization element, etc., on a surface of a base materials, in addition to a general coating film for esthetic enhancement and for improving durability and strength of the surface.

A forming method for film according to the present invention is characterized by comprising a process for forming an adhesive layer consisting of an adhesive having a weight average molecular weight of 250,000 or more on a base material directly or via another layer, a process for adhering powders to a surface of the adhesive layer, a process for embedding the powders on a surface of the adhesive layer by granular pressure media and forming a powder layer as a monolayer, and a process for removing surplus powder adhering to a laminate formed above. Therefore, according to the present invention, each property of the powders can be imparted by coating a super thin film on the surface of a base material, and the method can be applied to various uses.

Additionally, it is an object of the present invention to provide a production method for a filler lens in which the lens effect of the filler is sufficient and the optical properties are maintained even under high-temperatures and high-humidity. A production method for a filler lens according to the present invention is a method for producing a filler lens comprising a base material, an adhesive layer provided on said base material directly or via another layer, consisting of at least radiation-curable resin, a filler layer in which fillers are embedded on a surface of the adhesive layer so that part of the filler protrudes from a surface thereof, and it is characterized by comprising a process for forming the adhesive layer on the base material directly or via another layer, a process for embedding the fillers on a surface of the adhesive layer by striking the filler using an external force via pressure media, a process for curing the adhesive layer, and a process for removing surplus powders adhered to a laminate formed above. As a method for embedding fillers in an adhesive layer, specifically, a method in which granular pressure media are vibrated, the pressure media strike fillers, and the fillers are thereby embedded in an adhesive layer, can be employed.

According to the production method for a filler lens of the present invention, a filler lens having a composition in which the embedding depths of fillers are made uniform, fillers are placed in the planar direction at high density, and fillers are embedded as a monolayer on a surface of the adhesive layer so that part of the filler protrudes from a surface thereof. Furthermore, in this filler lens, since the adhesive of the adhesive layer in which the fillers are embedded is cured, the adhesive will not flowed by heating even under high-temperatures and high-humidity, and optical properties of the filler lens can be thereby maintained constant.

The present invention consists of two kinds of compositions in the first embodiment which is a general forming method for monolayer powder film applied to various uses and the second embodiment applied to production of the filler lens. FIG. 1 is a sectional view schematically showing an example of a powder film or a filler lens obtained by a method according to the first embodiment or the second embodiment of the present invention. In this monolayer powder film (filler lens) L, an adhesive layer 2 is coated directly on a base material 1, a large number of powder particles (fillers) 3 are embedded as a monolayer on a surface of this adhesive layer 2 so that parts thereof protrude from a surface of the adhesive layer 2 and the fillers are placed in the planar direction at high density, and a powder layer (filler layer) 3A is thereby formed.

In the following, each embodiment will be explained in detail.

1. First Embodiment

Firstly, a forming method for monolayer powder film according to a first embodiment of the present invention is explained in the order of the process.

Process 1: Coating Adhesive Layer

As a base material, film shaped materials or sheet shaped materials, in which an adhesive layer can be coated by a coater, are preferable. Specifically, various resin films consisting of polyethylene terephthalate (PET), polyethylene naphthalate (PEN), triacetyl cellulose (TAC), polyalate, polyimide, polyether, polycarbonate, polysulfone, polyethersulfone, cellophane, aromatic polyamide, polyethylene, polypropylene, polyvinyl alcohol, etc., can be suitably employed. In addition, as a base material other than such resin films, hard plates consisting of the above resin, sheet shaped members consisting of glass material such as silica glass, soda glass, etc., can be employed. Both transparent base materials and non-transparent base materials can be employed, and in particular, the thickness of the base material is preferably 1 μm to 5 mm in consideration of productivity.

As a layer provided as necessary, a binding layer for firmly adhering an adhesive layer to a base material, coloring layer, conductive layer, charged layer, antistatic layer, adjusting layer for adjusting refractive index or transmittance of light, etc., can be appropriately employed according to application and purpose.

Furthermore, as an adhesive for forming an adhesive layer, adhesives consisting of resin such as polyester type resin, epoxy type resin, polyurethane type resin, silicone type resin, acrylic type resin, etc., can be employed. These may be employed alone or in combination. In particular, an acrylic type adhesive is preferred, since water resistance, heat-resistance, light resistance, etc., are superior, adhesive strength and transparency are good, and in addition, the refractive index is easily adjusted when the adhesive is used for an optical use. As an acrylic type adhesive, a homopolymer or copolymer of acrylic monomer such as acrylic acid and an ester thereof, methacrylic acid and an ester thereof, acrylamide, acrylic nitrile, etc., and a copolymer of at least one kind of the above acrylic monomers and aromatic vinyl monomer such as vinyl acetate, maleic anhydride, styrene, etc., can be employed. In particular, a copolymer consisting of a primary monomer for providing adhesiveness such as ethylene acrylate, butylacrylate, 2-ethylhexyl acrylate, etc., a monomer as a cohesion component such as vinyl acetate, acrylic nitrile, acrylamide, styrene, methacrylate, methylacrylate, etc., and a monomer having functional groups for improving adhesive strength and for initiating cross-linking, methacrylic acid, acrylic acid, itaconic acid, hydroxyethyl methacrylate, hydroxypropyl methacrylate, dimethylaminoethyl methacrylate, dimethylaminomethyl methacrylate, acrylamide, methylolacrylamide, glycidyl methacrylate, maleic anhydride, etc., can be preferably employed. The Tg (the glass transition point) of the copolymer is preferably −55 to −15° C., and is more preferably −55 to −30° C. The weight average molecular weight thereof is preferably 250,000 or more, and is more preferably 250,000 to one million.

In the case in which an adhesive layer consists of an adhesive in which the Tg is lower than −55° C. and an adhesive in which the weight average molecular weight is below 250,000, the powders once adhered are torn away by the impulsive force of the pressure media since the layer is too soft, and defects such as powder coming off, etc., occur easily. In addition, the adhesive adheres to the powders after they are torn away, and the powders are adhered on the powder layer again. Furthermore, in the case in which the adhesive layer is too soft, the powders are rotated in a longitudinal direction on the surface of the adhesive layer by impact of the pressure media. Whereby, the position, in which the adhesive is adhered, of the powders appears on the surface of the powder layer and other powders are adhered thereto, or the adhesive oozes from openings of the powders by the impulsive force of the pressure media or by capillarity, and other powders are adhered thereto. Since the powder layer is easily formed as a multilayer constitution by such phenomena, a soft adhesive layer is not desirable. In contrast, in the case of an adhesive layer in which the Tg is higher than −30° C., this is not desirable since the adhesive strength is insufficient and the powders easily fall off in the process of washing off surplus powders, etc.

In addition, in the above adhesive, as a hardener, specifically, a crosslinking agent of the metal chelate type, isocyanate type, and epoxy type can be employed alone or in combination, as necessary. It is desirable in practice that the hardener be mixed so that adhesive strength (Japanese Industrial Standard Z-02378) of the adhesive layer is 100 g/25 mm or more. In the case in which the adhesive strength is below 100 g/25 mm, falling off of the powder occurs and environmental resistance is deteriorated. In particular, there is a risk that the adhesive layer will come off the base material under high-temperatures and high-humidity. In addition, from the viewpoint of reliability, the gel fraction after hardening is preferably 40% or more, is more preferably 50% or more, and is most preferably 60% or more. In the case in which the gel fraction is below 40%, there is a risk that the adhesive layer will soften under high-temperatures and high-humidity, the powders will sink in the adhesive layer, and properties of the powder film will change. Furthermore, a UV curable-type adhesive added to the photopolymerizing monomer, oligomer, polymer and photopolymerization initiator may be employed in the adhesive. In addition, various additives such as coupling agents, surface tension adjusting agents, color pigments, dyes, waxes, thickeners, antioxidants, rust-preventive agents, antibacterial agents, ultraviolet absorbing agents, etc., may be added to the adhesive as necessary.

An acrylic type adhesive is coated on one side or both sides of the above base material directly or via another layer by a coating method such as air doctor coating, blade coating, knife coating, reverse coating, transfer roll coating, photogravure roll coating, kiss coating, cast coating, spray coating, slot orifice coating, calender coating, electrodeposition coating, dip coatings, die coating, etc., or a printing method such as letterpress printing such as flexography, etc., intaglio printing such as direct gravure, offset gravure, etc., lithographic printing such as offset printing, etc., stencil printing such as screen printing, etc., or the like, and this is laminated as an adhesive layer. In particular, a coating using a roll coater is desirable, because a uniform layer thickness is obtained. Although the thickness of the adhesive layer is not particularly limited, it is preferably about 0.1 to 5 times the volume average particle diameter of powders to be embedded, since the adhesive layer is wasted when it is too thick.

In the case in which the hardener component is included in the adhesive layer, it is preferable that the adhesive layer be protected by a separation PET film, etc.; it is aged at about 20 to 80° C. for about 3 to 14 days; hardness of the adhesive layer be stabilized by sufficiently reacting the adhesive and the hardener at the cross-linking point of the adhesive; and then the next process be carried out.

Process 2: Adhesion of Powder to the Surface of Adhesive Layer

Next, by carrying out a process in which powders are previously adhered on the surface of an adhesive layer on a base material, pressure media can be prevented from adhering to an adhesive layer, and in addition, the powder layer can be formed so that the filling density in the planar direction is high and is uniform.

A film obtained by a forming method of the present invention refers to a film formed in order to give various functions such as polishing application, non-slipping or slipping application, light-reflecting or anti-reflecting improvement application, insulating application, heat radiation application, endothermic application, etc., on a surface of a base materials, and this is broadly applicable in the present invention.

Powders which can be used in each application are illustrated in the following.

(a) Imparting Grinding, Polishing, and Brushing Functions:

In this case, coated objects serve as files or abrasives.
Examples of powders to be used: atomized kelmet powder, bronze powder, sodium montmorillonite powder, zircon sand powder, alumina powder, silicon carbide powder, cerium powder, glass powder, diamond powder, boron carbide powder, aluminum nitride powder, silicon nitride powder, etc.

(b) Imparting Non-Slip Function
Examples of powders to be used: atomized kelmet powder, bronze powder, sodium montmorillonite powder, zircon sand powder, alumina powder, silicon carbide powder, cerium powder, glass powder, etc.

(c) Imparting Slippage (Decreasing Wear) Function
Examples of powders to be used: graphite powder, resin powders such as polytetrafluoroethylene, nylon, polyvinylidene fluoride, fluoroethylene-propylene copolymer resin, etc., or the like (d) Imparting Light Reflection, Diffusion Function
In this case, coated objects serve as reflection marks, reflection sheets, reflection crosses, LCDs, ELs, FEDs, etc.
Examples of powders to be used: glass powder, inorganic-type powders such as silica, alumina, etc., organic-type powders such as acrylic resin, polystyrene resin, polyethylene resin, epoxy resin, silicone resin, polyvinylidene fluoride, Teflon, etc.

(e) Imparting Light Reflection Prevention Function
Examples of powders to be used: silica powder, titania powder, etc.

(f) Imparting Electrification
Examples of powders to be used: resin powders such as nylon, polyethylene, methacrylic resin, polytetrafluoroethylene, fluoroethylene-propylene copolymer resin, etc. or the like (g) Imparting Conductivity, Non-Electrification
Examples of powders to be used: aluminum powder, zinc powder, copper powder, gold powder, silver powder, nickel powder, iron powder, tungsten powder, carbon black powder, etc.

(h) Imparting Electric Insulation
Examples of powders to be used: chrysotile powder, silicon carbide powder, etc.

(i) Imparting Heat Radiation
Examples of powders to be used: molybdenum powder, tantalum powder, etc.

(j) Imparting Anticorrosiveness, Heat-Resistance
Examples of powders to be used: niobium powder, tantalum powder, kaolinite powder, kaolin powder, halloysite powder, pottery stone powder, agalmatolite powder, sericite powder, allophane powder, sizicon sand powder, alumina powder, glass powder, etc.

(k) Use as Polarizer
Examples of powders to be used: ferromagnetic particles such as iron, iron oxide, chromium oxide, etc., or the like (l) Imparting Heat dissipation, Endothermy
Examples of powders to be used: copper powder, magnesia powder, etc.

In the case of use of the above powders, since by uniformly transmitting impulsive force of granular pressure media to powders, the filling density in the planar direction of a powder layer can be increased and be made uniform, and in addition, the embedding depth of the powders in an adhesive layer can be made uniform. Therefore, it is preferable that the powders satisfy the following conditions.

① It is desirable that particle size distribution of the powders be sharp, and specifically, it is preferably 0.8 to 1.0, and is more preferably 0.9 to 1.0.

② It is desirable that powders be globular and that the roundness of the powder is preferably 80% or more and is more preferably 90% or more.

In the present specification, the volume average particle diameter of powders is defined by the following general equation (1), and the particle size distribution of the powders is defined by the following general equation (2).

$$\text{Particle size distribution} = \text{Number average particle diameter/Volume average particle diameter.} \quad (1)$$

Number average particle diameter=An average value in which diameters of 100 powders sampled at random are measured and are averaged $$\text{Volume average particle diameter} = \text{A diameter of powder in which powder particles are regarded as being true spheres; each volume is calculated by diameters of 100 powders sampled at random; and the volumes are added up in order of small volume until the added value is reached to 50% of the total volume summed up all calculated volumes.} \quad (2)$$

In addition, "roundness" is defined by the following general equation (3).

$$\text{Roundness } (\%) = (4\pi A/B^2) \times 100 \quad (3)$$

A: Projected area of powder
B: Circumference of powder

For example, projection images are obtained by photographing using a transmission electron microscope, and are subjected to an image analysis using an image analysis apparatus (for example, trade name: EXECL II; produced by Nippon Avionics Co., Ltd.), and the above A and B are thereby obtained. Subsequently, roundness can be calculated from the A and B. As is apparent from the above equation (3), the closer the powder approximates a true sphere, the closer the roundness approximates 100%, and in the case of an undefined shape, the roundness is less than that value. In the present specification, average value measured with respect to 10 powders is defined as roundness.

As a specific method for adhering the above powder to the surface of the above-mentioned adhesive layer, for example, a method in which powders filled in a container are fluidized by vibration or fluidization air and a base material is passed under this fluidized powder, and a method in which powders are sprayed on the adhesive layer by air spraying, can be employed. At this time, with respect to a powder in which the particle size distribution is 0.8 to 1.0 or in which roundness is 80% or more, the powders are easily fluidized in the container since the specific surface is small and fluidity is high, and in addition, the powders are easily mixed with air in the case of air spraying. Therefore, such powder is suitable for uniformly adhering to the surface of the adhesive layer. In a process for embedding the powders in the adhesive layer by pressure media, by uniformly adhering the powders to the surface of the adhesive layer, the pressure media can be prevented from adhering to the adhesive layer and defects such as powder coming off can be also reduced. In this process, it is sufficient if only the powders are adhered to the surface of the adhesive layer by adhesive strength of the adhesive layer, and there is no problem even if the powders are adhered so as to form multiple layers.

Process 3: Embedding Powders in Adhesive Layer

Powders adhered to the surface of the adhesive layer are embedded in the adhesive layer by impulsive force of pressure media. As such a method, pressure media are put into a suitable container and are vibrated with the container, a base material in which powders are adhered to the surface of an adhesive layer is put into this vibrated pressure media or is passed under this vibrated pressure media, and impulsive force is thereby imparted to the powders. Thus, the powders are struck by the pressure media and are thereby embedded in the surface of the adhesive layer. The granular pressure media is characterized in that the powders can be embedded in the adhesive layer to a uniform embedding depth because the granular pressure media can be uniformly struck over a small area of the powders. That is, filling density in the planar direction of the powder layer can be increased and be made uniform, since other powders can be pushed into openings between the powders adhered on the surface of the adhesive layer in the above process to a uniform depth by impulsive force of the pressure media. According to such a method, powders are formed as a powder layer in which the powders are uniformly embedded in the adhesive layer at high density, as a monolayer, without the powders piling up in the adhesive layer, so that embedding depths are made uniform and part of the powder protrudes from the adhesive layer. At this time, in order to make up for a shortage in the amount of powder, pressure medium previously mixed with about 0.5 to 2.0 parts by weight of powder to 100 parts by weight of pressure medium may be used.

As an external force for embedding powders, in addition to vibration, rotation, falling, etc., may be adopted. In the case of rotation, a rotating container, a container having stirring fins therein, etc., can be used. In the case in which falling is adopted as an external force, a V blender, a tumbler, etc., can be used.

Hereinbelow, pressure media for embedding powders are explained. The pressure media are particles to cause powders to be embedded in an adhesive layer by striking due to vibration, etc., as described above. As a pressure medium, particles consisting of iron, carbon steel, alloy steel, copper and copper alloy, aluminum and aluminum alloy, and other various metals or alloys; particles consisting of ceramics such as $Al_2O_3$, $SiO_2$, $TiO_2$, $ZrO_2$, SiC, etc.; and in addition, particles consisting of glass, hard plastics, etc.; can be used. Furthermore, particles consisting of hard rubber may be used if a sufficient stroke force can be imparted to the powders. In any case, material for the pressure medium is chosen appropriately depending on the material of the powder, etc. In addition, it is desirable that the shape thereof approximate a true sphere so that pressuring force is made uniform when applied to the powders, and it is desirable that total particle distribution be as narrow as possible. The particle size of the pressure medium is chosen appropriately depending on material and embedding depth of the powder, and in particular, it is preferably about 0.3 to 2.0 mm.

Process 4: Removing Surplus Powders

After the embedding process of the powders in the adhesive layer, surplus powders are removed. Surplus powders are, for example, powders which are embedded imperfectly in the adhesive layer, or which only adhered on embedded powders by interparticle forces such as electrostatic forces, van der Waals forces, etc. Such surplus powders can be removed by washing in water or by applying fluidic pressure by air blasts, etc., to the powder layer. At this time, in the case in which the particle size of the powder is relatively small, it is desirable that the powder layer be washed wet using ion exchanged water, etc. In addition, in the case in which the volume average particle diameter is 15 $\mu$m or less, it is preferable that the powder layer be soaked in ion exchanged water to which is added a washing auxiliary agent such as a surfactant, etc., or the like, and be subjected to ultrasonic washing, etc., and then be rinsed sufficiently by deionized water, etc., and be dried, since there is a risk that the surplus powder will be insufficiently removed by use of fluidic pressure alone.

2. Second Embodiment

Secondly, a production method for a filler lens according to second embodiment of the present invention is explained. In the production method, only differences are explained since it is almost the same as in the first embodiment, and subsequently, compositional materials which are suitable for filler lens produced by the present embodiment are explained.

(1) Production Method

In the coating process of the adhesive layer, the thickness of the adhesive layer is preferably 0.5 to 2 times the average particle diameter of the embedding filler.

In the embedding process of fillers, in order to prevent fillers from coming out from the adhesive layer and to reliably yield a lens effect by protruding the fillers from the surface of the adhesive layer, the embedding depth of fillers is preferably such that the fillers are embedded in the adhesive layer to a depth of 10 to 90% of the diameter, more preferably 30 to 90%, and most preferably 40 to 70%, and this can be adjusted depending on the optical properties of the lenses.

In the present embodiment, a process for curing the adhesive layer is included between the embedding process for fillers and the removing process for surplus fillers. In this process, an adhesive is cured by exposure to radiation such as ultraviolet light, electron beams, etc., of the adhesive layer embedded fillers. Until the above embedding process of fillers, it is desirable that the adhesive be soft and that the embedding depth of fillers be easily controlled, and after the fillers are embedded, in order to maintain optical properties of the filler lens, it must be radiation-cured so as not to be susceptible to flowing under high-temperatures and high-humidity.

The adhering process of fillers and the removing process of surplus fillers are the same as that of the first embodiment.

(2) Compositional Materials

① Base Material

As a base material for the filler lens of the present embodiment, well-known film shaped materials or sheet shaped materials, specifically, base materials consisting of material described in the above first embodiment, can be employed. Non-transparent base materials can be also employed even if light can penetrate therein, and in particular, in the case in which it is used in a liquid crystal display, etc., it is preferable that transparent base materials have a refractive index (Japanese Industrial Standard K-7142) of 1.45 to 1.55, in order to adapt the refractive index therefor. As such a transparent base material, acrylic resin film such as triacetylcellulose (TAC), polymethyl methacrylate, etc., can be employed. The higher the transparency thereof, the more desirable the transparent substrate. The light transmittance (Japanese Industrial Standard C-6714) is preferably 80% or more, and is more preferably 90% or more. The Haze value (Japanese Industrial Standard K-7105) is preferably 1.0 or less, and is more preferably 0.5 or less. In the case in which the transparent base material is used for a small and lightweight liquid crystal display, it is more preferable that the transparent base material be of a film shape. The thickness of the base material is desirably thin from the viewpoint of illumination as in the first embodiment, and it is preferably 1 $\mu$m to 5 mm in consideration of productivity.

② Adhesive Layer

The adhesive layer in the present embodiment contains at least radiation (ultraviolet ray, electron beam, etc.) curable resin. In such a resin, hardeners such as crosslinking agents, polymerization initiators, etc., polymerization promotors, solvents, viscosity modifiers, etc., can be added as necessary, and can be used alone or in combination. In the case in which the base material is a plastic film, the curing temperature cannot be set high. In particular, in the case in which PET or TAC is used, it is desirable that the curable resin can be cured at 100° C. or less.

As a radiation curable type resin, specifically, polyester resin, polyether resin, acrylic resin, epoxy resin, alkyd resin, polybutadiene resin, spirol acetal resin, urethane resin, oligomers or prepolymers of (metha)acrylate as a multifunctional compound such as the polyalcohol, can be employed. As a reactive diluent, monofunctional monomers or polyfunctional monomers such as ethyl (metha)acrylate, ethylhexyl (metha)acrylate, styrene, methylstyrene, N-vinylpyrrolidone, etc., or the like, can be employed. In particular, acrylic resin is preferred, since transparency, water resistance, heat-resistance, light resistance, adhesive strength, etc., are superior, and in addition, the refractive index is easily adjusted so as to adapt therefor in the case in which it is used in a liquid crystal display.

In the adhesive layer, a thermosetting resin can be employed, in order to adjust the adhesive strength, etc. As a thermosetting resin, acrylic resin, phenol resin, melamine resin, polyurethane resin, urea resin, diallylphthalate resin, guanamine resin, unsaturated polyester resin, amino alkyd resin, melamine-urea cocondensated resin, silicon resin, polysiloxane resin, etc., can be employed. Of these resins, acrylic resin is particularly preferred because of adhesive strength, viscosity control of coating material, transparency, etc. As an acrylic type adhesive, specifically, a homopolymer or copolymer of an acrylic monomer such as acrylic acid and esters thereof, methacrylic acid and esters thereof, acrylamide, acrylic nitrile, etc., and copolymers of at least one kind of the above acrylic monomers and aromatic vinyl monomer such as vinyl acetate, maleic anhydride, styrene, etc., can be employed. In particular, copolymers consisting of primary monomers for providing adhesiveness, such as ethylene acrylate, butylacrylate, 2-ethylhexyl acrylate, etc., monomers as a cohesion component, such as vinyl acetate, acrylic nitrile, acrylamide, styrene, methacrylate, methylacrylate, etc., and monomers having functional groups for improving adhesive strength and for cross-linking initiation, methacrylic acid, acrylic acid, itaconic acid, hydroxyethyl methacrylate, hydroxypropyl methacrylate, dimethylaminoethyl methacrylate, dimethylaminomethyl methacrylate, acrylamide, methylolacrylamide, glycidyl methacrylate, maleic anhydride, etc., can preferably be employed. The Tg (glass transition point) of the copolymer is preferably −60 to −15° C., and the weight average molecular weight thereof is preferably 200,000 to 1,000,000. When the Tg is below −60° C., the adhesive layer is too soft and an embedded filler layer is easily damaged. In contrast, when the Tg is above −15° C., it is difficult to embed fillers.

In order to cure radiation curable type resins used in the present embodiment, for example, although radiation such as ultraviolet light, electron beams, X-rays, etc., may be irradiated, it is necessary to add a photopolymerization initiator when it is to be cured by ultraviolet light. As a photopolymerization initiator, benzophenones, α-amyloxim ester, Michler's benzoyl benzoate, tetramethylthiuram monosulfide, thioxanthones, can be employed by mixing therewith, and as a photo sensitizer, n-butylamine, triethylamine, etc., can be also employed. The content of the photopolymerization initiator is preferably 0.1 to 10% by weight to the radiation curable type resin. The effect is deteriorated above or below this range. As a hardener for the thermosetting resin, for example, crosslinking agents of the metal chelate type, isocyanate type, or epoxy type, can be employed alone or in combination, as necessary.

In the present embodiment, it is desirable in practice that adhesive be mixed in the adhesive layer so that adhesive strength (180 degree pulling out adhesive strength according to Japanese Industrial Standard Z-0237) of the adhesive layer before curing the radiation curable type resin is 50 to 3000 g/25 mm, and the adhesive strength after radiation curing is 30 g/25 mm or less. In the case in which adhesive strength before curing is below 50 g/25 mm, it is difficult to embed fillers, and embedded fillers easily fall out. In contrast, in the case in which it is above 3000 g/25 mm, fillers are excessively embedded and the surface of the formed filler layer is easily damaged and yields easily to pressure. Furthermore, in the case in which adhesive strength after curing is above 30 g/25 mm, the surface of the filler layer is easily damaged and yields easily to pressure, environment resistance is deteriorated, and in particular, there is a risk that optical properties will change under high-temperatures and high-humidity.

③ Filler

As a filler, transparent or white pigment of an inorganic type such as silica, alumina, etc., transparent or white pigment of an organic type such as acrylic resin, polystyrene resin, polyethylene resin, epoxy resin, silicone resin, polyvinylidene fluoride, Teflon, etc., or the like, can be employed. In particular, silica, acryl beads, and silicon beads are preferred. The filler is preferably globular and the roundness is preferably 80% or more, and is more preferably 90% or more. A globular filler has a merit in that dispersion of the embedding depth is difficult to cause. Average particle diameter (Japanese Industrial Standard B-9921) is preferably 1 to 50 $\mu$m, is more preferably 3 to 30 $\mu$m, and is most preferably 3 to 9 $\mu$m. In addition, in order to yield a good lens effect, it is preferable that the particle size distribution be narrow, and in the case of mono-dispersion, the best effect is obtained. Here, "roundness" in the present embodiment is the same as defined in the above first embodiment.

In the case in which it is used in a liquid crystal display, etc., it is preferable that the refractive index of the filler be 1.45 to 1.55, in order to adapt the refractive index therefor, and in addition, each difference in refractive index between a base material, an adhesive layer, and a filler are preferably below 0.30, and are more preferably below 0.15.

④ Other Layers

As another layer, an adjustment layer for adjusting the refractive index or permeability of the light, binding layer for firmly binding a base material and an adhesive layer, etc., may be provided.

BEST MODE FOR CARRYING OUT THE INVENTION

1. First Embodiment

Figure 1:
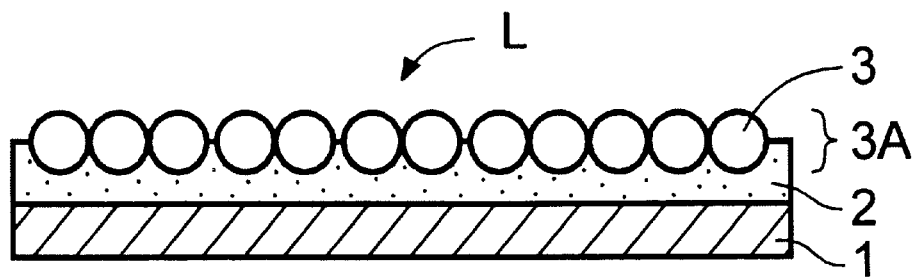
FIG. 1 shows a sectional schematic view of an example of a powder film or a filler lens obtained by a production method according to the present invention.

With respect to a method for forming a monolayer powder film according to the first embodiment of the present invention, the effects of the present invention are more specifically explained by way of examples.

(1) Preparation of Acrylic Polymer

Firstly, preparation of acrylic polymer, which is a main component of the acrylic-type adhesive employed in an adhesive layer of the monolayer powder film according to this embodiment, is explained.

Acrylic Polymer a 94 parts by weight of n-butyl acrylate, 3 parts by weight of acrylic acid, 1 weight part of 2-hydroxy acrylate, 0.3 parts by weight of benzoyl peroxide, 40 weight part of ethyl acetate, and 60 parts by weight of toluene were added in a flask having a thermometer, a stirrer, a reflux condenser, and a nitrogen feeding tube. The flask was filled with nitrogen by feeding nitrogen thereinto through the nitrogen feeding tube, and was heated to 65° C., and the polymerization reaction was allowed to proceed for 10 hours. An acrylic polymer solution having a weight average molecular weight of about 1,000,000 and a Tg of about −50° C. was thereby obtained. Subsequently, methyl isobutyl ketone was added in this acrylic polymer solution so that a solid concentration thereof was 20% by weight, and therefore, an acrylic polymer a was prepared.

Acrylic Polymer b 75 parts by weight of n-butyl acrylate, 10 parts by weight of methyl acrylate, 5 parts by weight of methyl methacrylate, 3 parts by weight of acrylic acid, 1 weight part of 2-hydroxy acrylate, 0.6 parts by weight of benzoyl peroxide, 40 weight part of ethyl acetate, and 60 parts by weight of toluene were added in a flask having a thermometer, a stirrer, a reflux condenser, and a nitrogen feeding tube. The flask was filled with nitrogen by feeding nitrogen thereinto through the nitrogen feeding tube, and was heated to 65° C., and the polymerization reaction was allowed to proceed for 7 hours. An acrylic polymer solution having a weight average molecular weight of about 290,000 and a Tg of about −35° C. was thereby obtained. Subsequently, methyl isobutyl ketone was added in this acrylic polymer solution so that a solid concentration thereof was 20% by weight, and therefore, an acrylic polymer b was prepared.

Acrylic Polymer c 94 parts by weight of n-butyl acrylate, 3 parts by weight of acrylic acid, 1 weight part of 2-hydroxy acrylate, 0.9 parts by weight of benzoyl peroxide, 40 weight part of ethyl acetate, and 60 parts by weight of toluene were added in a flask having a thermometer, a stirrer, a reflux condenser, and a nitrogen feeding tube. The flask was filled with nitrogen by feeding nitrogen thereinto through the nitrogen feeding tube, and was heated to 65° C., and the polymerization reaction was allowed to proceed for 3 hours. An acrylic polymer solution having a weight average molecular weight of about 50,000 and a Tg of about −50° C. was thereby obtained. Subsequently, methyl isobutyl ketone was added in this acrylic polymer solution so that a solid concentration thereof was 20% by weight, and therefore, an acrylic polymer c was prepared.

(2) Production of Powder Film

Next, production of powder films of Samples 1 to 6 having an adhesive layer employing the above acrylic polymers is explained.

Sample 1

An adhesive added 0.35 parts by weight of isocyanate-type hardener (trade name: E-5XM) (epoxy type hardener) (produced by Soken Chemistry Co., Ltd.) to 100 parts by weight of acrylic polymer a, was coated on one side of a triacetyl cellulose film having a thickness of 80 μm (trade name: FUJI TAC) (triacetyl cellulose film) (produced by Fuji Photo Film Co., Ltd.) used as a transparent base material, by a reverse coater, so as to have a thickness of 3 μm after drying, and was dried at 100° C. for 2 minutes, and an adhesive layer was formed. Then, a separation PET film (trade name: 3811) (PET film) (produced by Lintec Corporation) was laminated on this coating surface, and the adhesive layer was cured to stand for 1 week in a constant temperature oven kept at 40° C. Subsequently, this film was cut to A5 size, and then the separation PET film was peeled off.

Next, methylsilicone bead (trade name: Tospearl 145; produced by GE Toshiba Silicone Co., Ltd.) having a volume average particle diameter of 2.6 μm, particle size distributions of 0.90, refractive index of 1.43, and roundness of 94%, used as a powder, was put into a porous plate container from which air was jetted from the bottom. Subsequently, this container was vibrated, and the powder was flowed by synergistic effects of the vibration and the jetted air. The above film provided with an adhesive layer on the surface was passed therethrough for an appropriate period, and the powder was thereby adhered on the surface of the adhesive layer.

Figure 2:
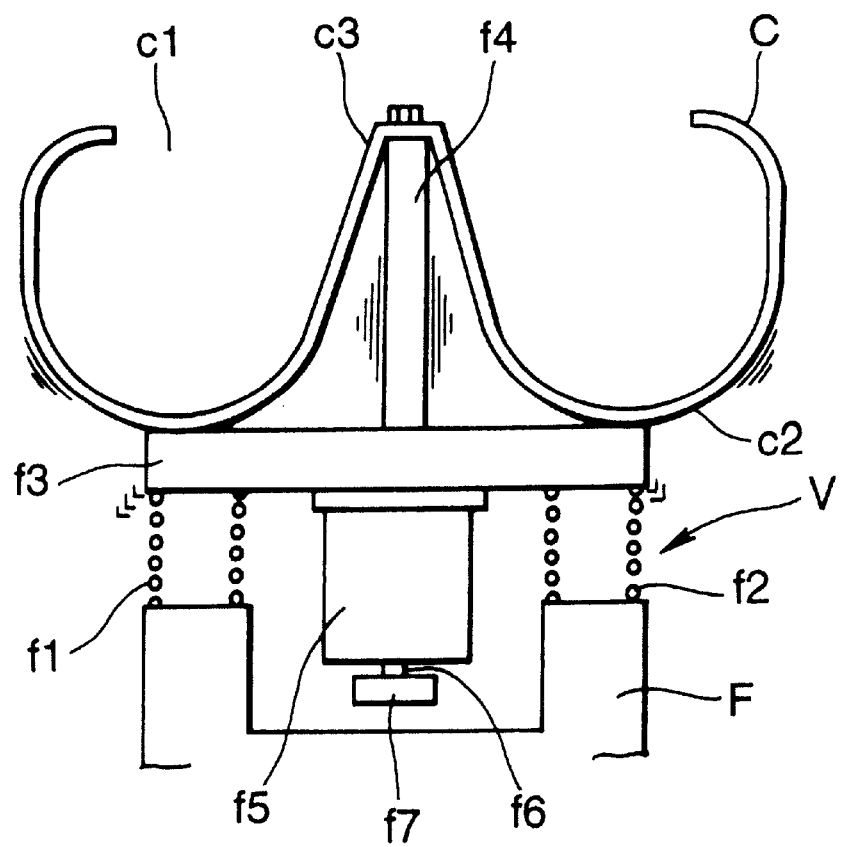
FIG. 2 shows a front sectional view of an excitation apparatus which is suitable for a production method of the present invention.

Then, the powder was embedded on the surface of the adhesive layer by an excitation apparatus shown in FIG. 2. According to this excitation apparatus, pressure medium, powder, and the above film are put into a container C set on an excitation mechanism V, these are vibrated with the container C by the excitation mechanism V, and the powder was thereby embedded on the adhesive layer of the film.

The container C consists of hard materials such as hard synthetic resin, metal, etc., and is formed in a bowl shape having an opening c1 at the upper portion thereof. A column portion c3 is protrudingly provided in the center of a bottom portion c2 so as to swell and protrude above and to reach same height as the opening c1. The excitation mechanism V is composed as follows: a vibrating plate f3 is mounted on machine stand F by way of coil springs f1 and f2; a vertical axis f4 extending above to the center portion of an upper surface of the vibrating plate f3 is protrudingly provided; a motor f5 is fixed at the center of a lower surface of the vibrating plate f3; and a heavy weight f7 is attached eccentrically to this output shaft f6 of the motor f5. The container C is mounted on the vibrating plate f3 and is set by fixing the upper edge of the column c3 on the upper edge of the vertical axis f4, and then the container C is vibrated, if the motor f5 is driven and the heavy weight f7 rotates.

3 kg of perfectly globular zirconia particles having a particle size of 0.5 mm was put into the container C of this excitation apparatus as a pressure medium, 30 g of the above powder was further put thereinto, and both were mixed. Next, in the excitation apparatus, while the container C was vibrated in the state in which the container C shown in FIG. 2 was inclined toward 45 degrees, and the above film was passed through the pressure medium by moving the bottom of the container C at a speed of 30 cm/min, so that the side of the adhesive layer to which the powder adhered was turned up. Thus, the powder was embedded on a surface of the adhesive layer by being struck due to the vibrating pressure medium, and a powder layer was thereby formed.

Subsequently, the surplus powder was washed away and removed by soaking the laminated body in 0.1% aqueous solution in which surfactant (trade name: LIPONOX NC-95) (surfactant) (produced by Lion Corporation) was added to ion exchanged water and by using ultrasonic waves. Next, the film was sufficiently washed by ion exchanged water, and then water was drained off the surface thereof by an air knife and was dried. Subsequently, the film was sufficiently dried by being left in a constant temperature oven of 40° C. for 3 days and was cooled at a room temperature, and a powder film of Sample 1 was thereby formed.

Sample 2

An adhesive to which was added 0.45 parts by weight of isocyanate-type hardener (trade name: L-45) (isocyanate-type hardener) (produced by Soken Chemistry Co., Ltd.) and 0.1 parts by weight of epoxy-type hardener (trade name: E-5XM) (epoxy-type hardener) (produced by Soken Chemistry Co., Ltd.) to 100 parts by weight of acrylic polymer b, was coated on one surface of the same transparent base material as Sample 1, by a reverse coater, so as to have a thickness of 5 $\mu$m after drying, and was dried at 100° C. for 2 minutes, and an adhesive layer was formed. Then, a separation PET film (trade name: 3811) (PET film) (produced by Lintec Corporation) was laminated on this coating surface, and the adhesive layer was cured to stand for 1 week in a constant temperature oven kept at 40° C. Subsequently, this film was cut to A5 size, and then the separation PET film was peeled off.

Next, methylsilicone bead (trade name: TOSPEARL 145) (methylsilicone bead) (produced by GE Toshiba Silicone Co., Ltd.) having a volume average particle diameter of 4.5 $\mu$m, particle size distributions of 0.94, refractive index of 1.43, and roundness of 96%, used as a powder, was blown on the adhesive layer of the film without applying voltage, using an electrostatic powder coating gun (trade name: GX-108) (powder coating gun) (produced by Chichibu Onoda Co., Ltd.), and the powder was adhered on the surface of the adhesive layer. The following processes were performed in the same manner as Sample 1, and a powder film of Sample 2 was thereby formed.

Sample 3

The same adhesive as Sample 1 was coated on one surface of the same transparent base material as Sample 1I by a reverse coater, so as to have a thickness of 7 $\mu$m after drying, and was dried at 10° C. for 2 minutes, and an adhesive layer was formed. Then, a separation PET film (trade name: 3811) (PET film) (produced by Lintec Corporation) was laminated on this coating surface, and the adhesive layer was cured to stand for 1 week in a constant temperature oven kept at 40° C. Subsequently, this film was cut to A5 size, and then the separation PET film was peeled off.

Next, methylmethacrylate bead (trade name: MX-1500H) (methylmethacrylate bead) (produced by Soken Chemistry Co., Ltd.) having a volume average particle diameter of 14.9 $\mu$m, particle size distributions of 0.96, and roundness of 92%, used as a powder, was adhered on the surface of the adhesive layer, in the same manner as Sample 2. The following processes were performed in the same manner as Sample 1, and a powder film of Sample 3 was thereby formed.

Sample 4

The same adhesive as Sample 1 was coated on one surface of the same transparent base material as Sample 1, by a reverse coater, so as to have a thickness of 30 $\mu$m after drying, and was dried at 100° C. for 2 minutes, and an adhesive layer was formed. Then, a separation PET film (trade name: 3811) (PET film) (produced by Lintec Corporation) was laminated on this coating surface, and the adhesive layer was cured to stand for 1 week in a constant temperature oven kept at 40° C. Subsequently, this film was cut to A5 size, and then the separation PET film was peeled off.

Next, copper powder having a volume average particle diameter of 7.2 $\mu$m, particle size distributions of 0.89, and roundness of 86%, used as a powder, was adhered on the surface of the adhesive layer, in the same manner as Sample 2. The following processes were performed in the same manner as Sample 1, and a powder film of Sample 4 was thereby formed.

Sample 5

Acrylic polymer b of Sample 2 was altered into acrylic polymer c, and an adhesive layer was formed in the same manner as Sample 2. Then, a process for laminating a separation PET film was omitted, and in a condition in which the adhesive layer was exposed, the adhesive layer was cured to stand for 1 week in a constant temperature oven kept at 40° C. Subsequently, this film was cut to A5 size. Here, with respect to the adhesive layer of Sample 5, since weight average molecular thereof is small and it was possible that a separation PET film is not clearly peeled off when the separation PET film is laminated and the adhesive layer is cured, the laminate process was omitted and the film in which the adhesive layer was cured in the exposed condition was used. Next, after process in which a powder was adhered on the surface of the adhesive layer, the same processes as Sample 2 were performed, and a powder film of Sample 5, which is a comparative example with respect to the present embodiment, was thereby formed.

Sample 6

The same adhesive as Sample 1 was coated on one surface of the same transparent base material as Sample 1, by a reverse coater, so as to have a thickness of 3 μm after drying, and was dried at 100° C. for 2 minutes, and an adhesive layer was formed. Then, a separation PET film (trade name: 3811) (PET film) (produced by Lintec Corporation) was laminated on this coating surface, and the adhesive layer was cured to stand for 1 week in a constant temperature oven kept at 40° C. Subsequently, this film was cut to A5 size, and then the separation PET film was peeled off.

Next, the powder used in Sample 2 was adhered on the adhesive layer in the same manner as Sample 2. Then, the adhered powder layer was leveled on the surface so as to have a thickness of 12.5 μm or less, using a YBA-type baker applicator (produced by Yoshimitsu Seiki Co., Ltd). Subsequently, the film to which the powder was adhered was inserted into a pressure roller (trade name: LAMIPACKER PD3204) (pressure roller) (produced by Fujipla Inc.) at a speed of 1.5 cm/second, and a filler was thereby embedded in the adhesive layer. The following processes were performed in the same manner as Sample 1, and a powder film of Sample 6, which is a comparative example with respect to the present embodiment, was thereby formed.

(3) Observation of Powder Layer

Figure 3A:
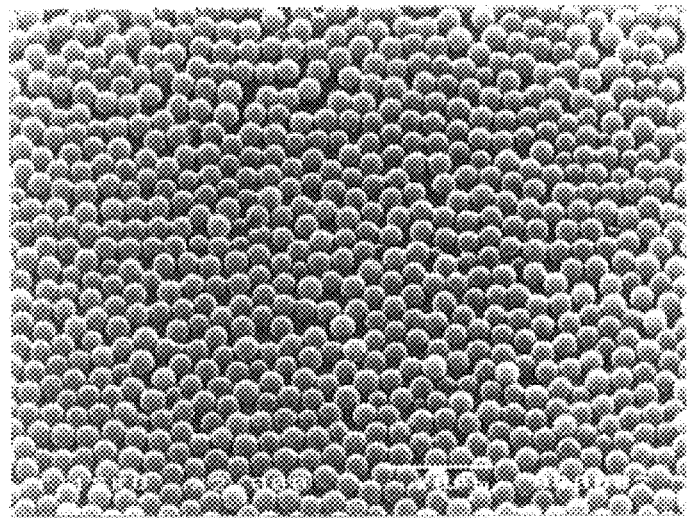
FIGS. 3A and 3B show photomicrographs of a plane view and a cross section view of a powder film of Sample 1 at a magnification of 2,000×, respectively.
Figure 3B:
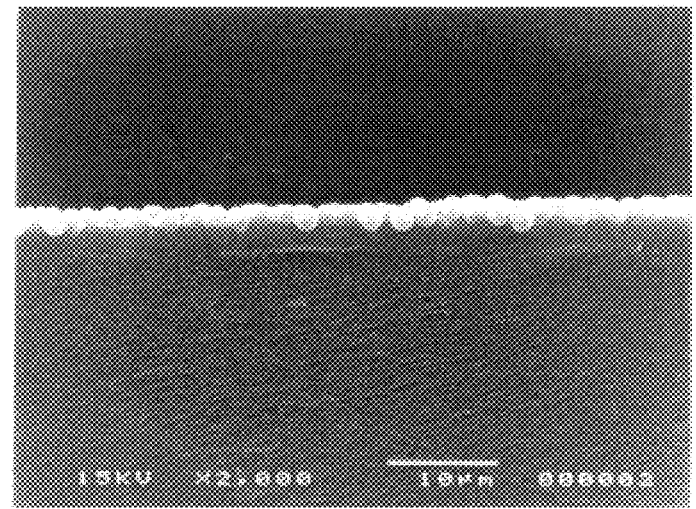
Figure 4A:
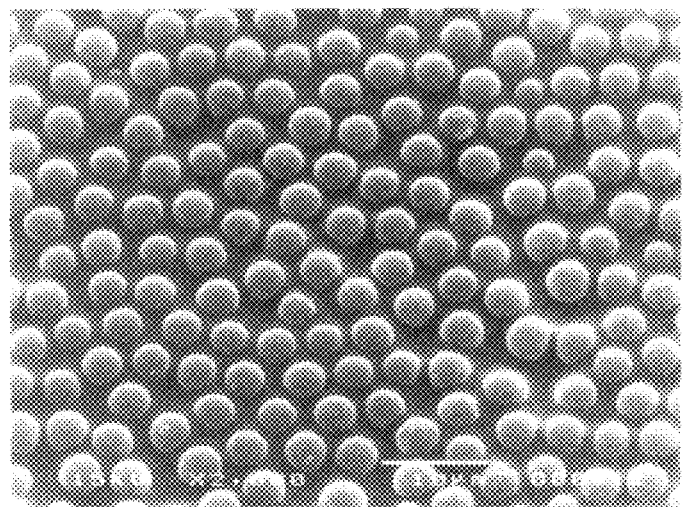
FIGS. 4A and 4B show photomicrographs of a plane view and a cross section view of a powder film of Sample 2 at a magnification of 2,000×, respectively.
Figure 4B:
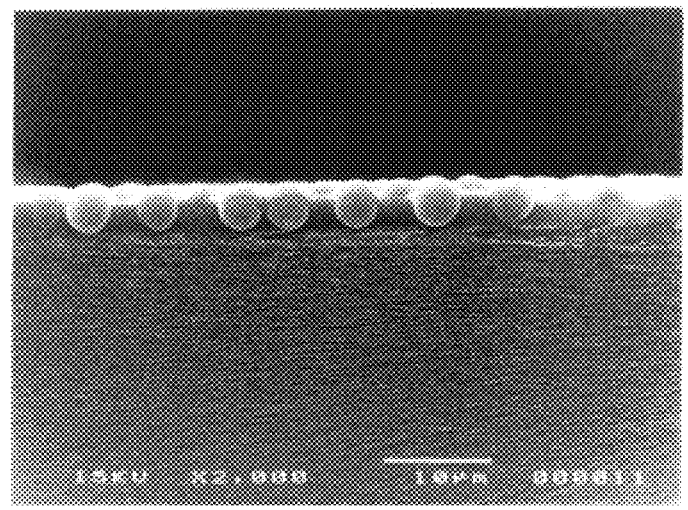
Figure 5A:
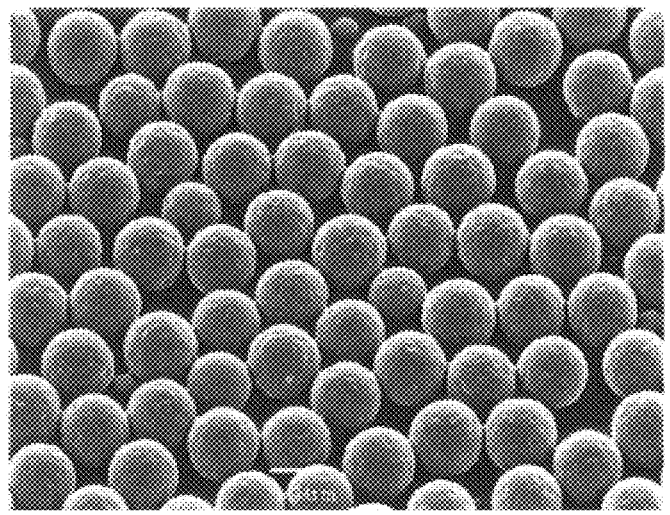
FIGS. 5A and 5B show photomicrographs of a plane view and a cross section view of a powder film of Sample 3 at a magnification of 1,000×, respectively.
Figure 5B:
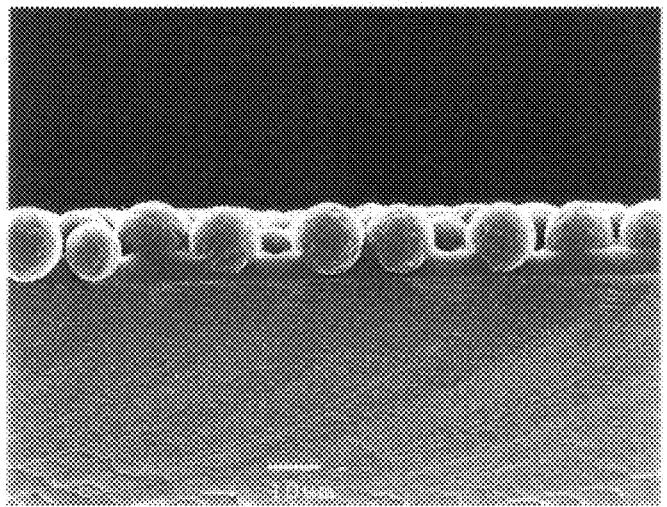
Figure 6A:
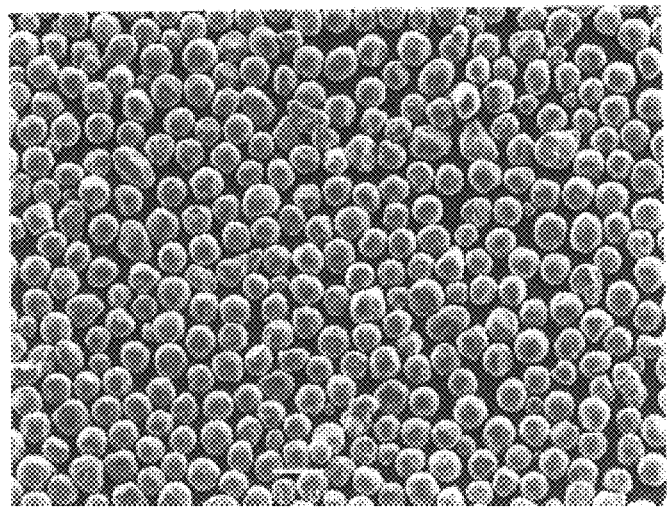
FIGS. 6A and 6B show photomicrographs of a plane view and a cross section view of a powder film of Sample 4 at a magnification of 1,000×, respectively.
Figure 6B:
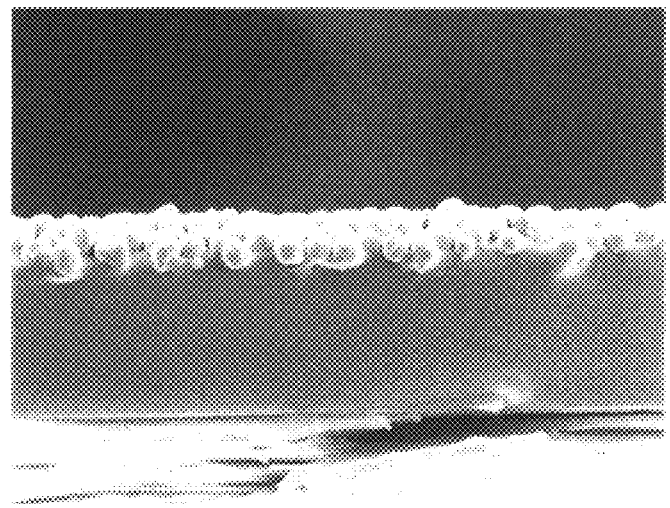
Figure 7A:
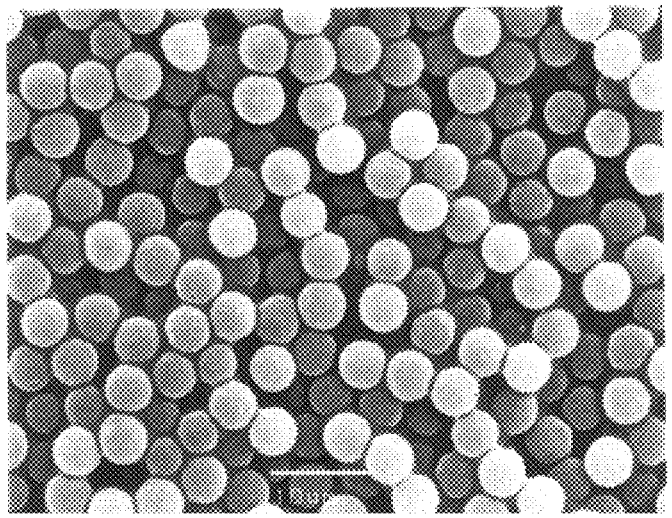
FIGS. 7A and 7B show photomicrographs of a plane view and a cross section view of a powder film of Sample 5 at a magnification of 2,000×, respectively.
Figure 7B:
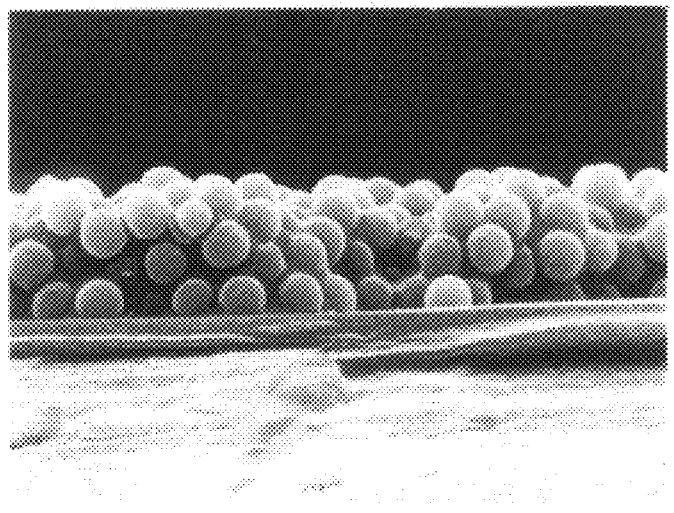
Figure 8A:
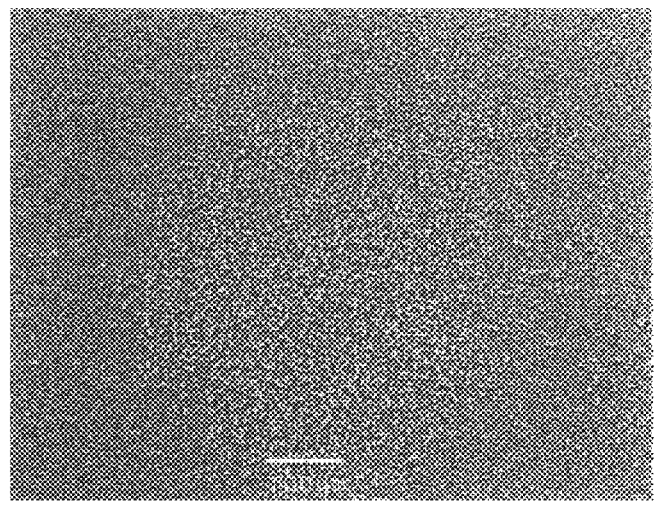
FIG. 8A show a photomicrograph of a plane view of a powder film of Sample 6 at a magnification of 150× and FIG. 8B shows a photomicrograph of a dense powder region in plane view at a magnification of 1,500×.
Figure 8B:
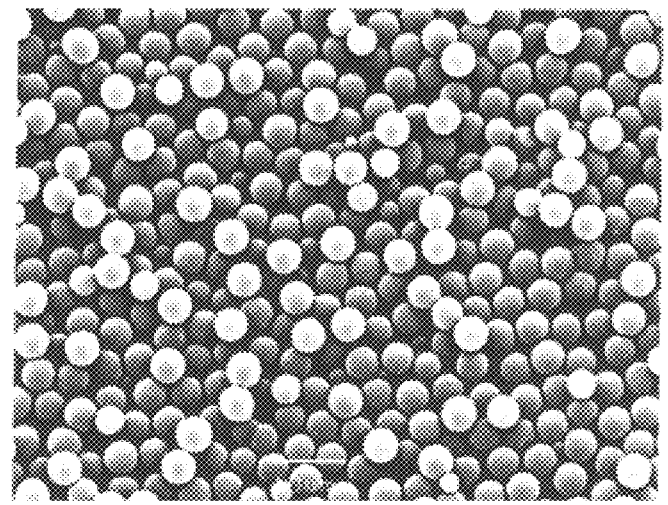
Figure 9A:
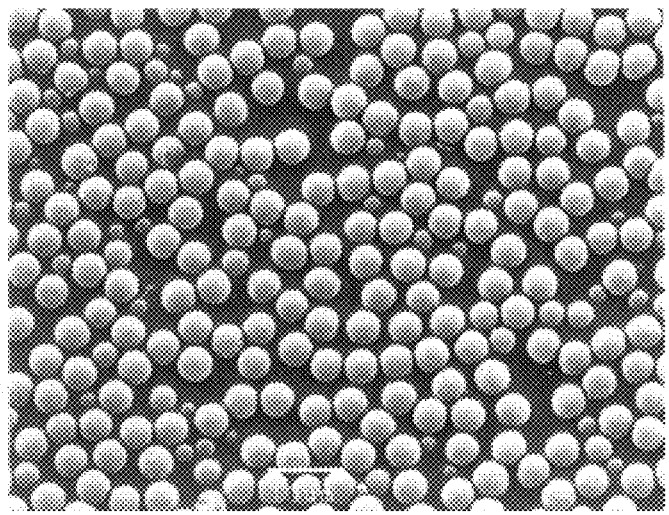
FIG. 9A shows a photomicrograph of a sparse powder region in plane view of a powder film of Sample 6 at a magnification of 1,500×
Figure 9B:
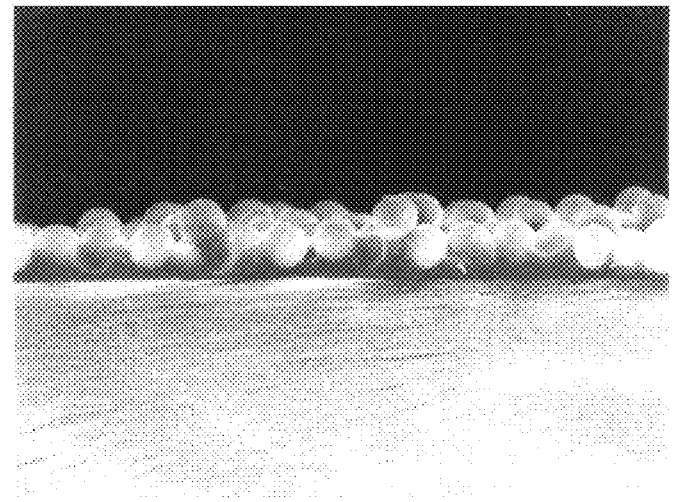
FIG. 9B shows a photomicrograph of a cross section view thereof at a magnification of 2,000×.

Plane views and cross section views of powder films of Samples 1 to 6 formed according to the above method were observed by an electron microscope. FIGS. 3A and 3B show electron photomicrographs of a plane view and a cross section view of a powder film of Sample 1 at a magnification of 2,000×, respectively. FIGS. 4A and 4B show electron photomicrographs of a plane view and a cross section view of a powder film of Sample 2 at a magnification of 2,000×, respectively. FIGS. 5A and 5B show electron photomicrographs of a plane view and a cross section view of a powder film of Sample 3 at a magnification of 1,000×, respectively. FIGS. 6A and 6B show electron photomicrographs of a plane view and a cross section view of a powder film of Sample 4 at a magnification of 1,000×, respectively. FIGS. 7A and 7B show electron photomicrographs of a plane view and a cross section view of a powder film of Sample 5 at a magnification of 2,000×, respectively. FIG. 8A shows an electron photomicrograph of a plane view of a powder film of Sample 6 at a magnification of 150×. FIGS. 8B and 9A show electron photomicrographs of plane views of a dense powder region and a sparse powder region on a powder film of Sample 6 at a magnification of 1,500×, respectively. FIG. 9B shows an electron photomicrograph of a cross section view of a powder film of Sample 6 at a magnification of 2,000×.

As shown in the plane photomicrographs A of FIGS. 3 to 6, powders had uniformly been filled to a high density in the powder films of Samples 1 to 4. As shown in the cross section photomicrographs B thereof, powders had been embedded to uniform depth so that part of the powder protrudes from a surface of an adhesive layer, as shown in FIG. 3B. In addition, as is apparent from FIGS. 7A and 7B, the powders had formed multiple layers in a powder film of Sample 5 in which an acrylic-type adhesive having a weight average molecular weight of 50,000 is used. Furthermore, as shown in FIG. 8A, in a powder film of Sample 6 in which powders are embedded therein by a pressing roller, filling density of the powders were not uniform, and regions where the powders had been embedded in two or more layers (FIG. 8B) and regions where filling density of the powders was low (FIG. 9A) therefore existed. It is thought that a powder film is not uniformly formed by uneven pressure of a pressing roller and that such regions are thereby formed. In addition, as is appear from FIG. 9B, in a powder film of Sample 6, the powders were embedded to nonuniform depth and regions where the powders are adhered in two or more layers had existed.

As explained above, according to the present invention, since powders embedded at a surface of a base material are formed in a monolayer structure in which part of the powder protrudes having a high density in the planar direction, an extremely thin powder film can be obtained. Thus, dimensional stability, weight reduction of a powder film, reduction in powder used, etc., are achieved. In addition, properties of the powder can be efficiently utilized since the powders protrude from an adhesive layer in uniform proportion. Furthermore, because uniformity of the surface thereof is high, the present invention can be applied in various fields as described above, and it is a very useful production technique in industry.

2. Second Embodiment

Next, with respect to a production method for filler lens according to the second embodiment of the present invention, the effect of the present invention is more specifically explained by the examples.

(1) Production of Filler Lens

Sample 7

As a transparent base material, triacetyl cellulose film having a film thickness of 80 μm (trade name: FUJI TAC UVD80; refractive index of 1.49) (triacetyl cellulose film) (produced by Fuji Photo Film Co., Ltd.) was employed. A coating solution consisting of the composition below was stirred and mixed for 15 minutes using a disper. The mixed coating solution was coated on one surface of the transparent base material by a reverse coater, so as to have a thickness of 10 μm after drying, and was dried at 100° C. for 2 minutes, and an adhesive layer was formed.

Composition of Coating Solution for Adhesive Layer

Acrylic-type adhesive (trade name: SK DAIN 1852; total solid concentration in ethylacetate of 23%) (acrylic-type adhesive) (produced by Soken Chemistry Co., Ltd.), 100 parts by weight Isocyanate-type hardener (trade name: D-90; total solid concentration in ethylacetate of 90%) (isocyanate-type hardener) (produced by Soken Chemistry Co., Ltd.), 1.5 parts by weight Epoxy-type compound (trade name: CYRACURE UVR-6110) (epoxy-type compound) (produced by Union Carbide Corp.), 45 parts by weight Acrylic-type compound Tripentaerythritol polyacrylate, 45 parts by weight Photocation polymerization initiator (trade name: CYRACURE UVI-6990) (photocation polymerization initiator) (produced by Union Carbide Corp.), 2 parts by weight Isopropyl alcohol, 5 parts by weight Methylethylketone, 210 parts by weight Ethylacetate, 650 parts by weight A filler other than a filler consisting of methyl silicone having a monodispersive particle size of 4.5 µm and refractive index of 1.45, was employed as a filler (powder), fillers were adhered on the surface in an adhesive layer and were embedded by impacts of pressure media using an excitation apparatus, in the same manner as the above examples of a forming method for a monolayer powder film according to the first embodiment.

Subsequently, the adhesive layer was exposed to UV radiation to cure the coating film, under the conditions of output powder: 120 W/cm; source distance (distance between the center of the lamp and the coating surface): 10 cm; treatment rate (speed with respect to the mercury lamp at the coating base material): 5 m/min, using one converging type high-pressure mercury lamp, and the adhesive layer was thereby cured. Next, surplus fillers were removed by washing the filler layer, using a hydraulic pressure shower of ion exchanged water, and then, the entire laminated material was dried by blowing air. Furthermore, aging was carried out at 20 to 40° C. for 10 days, and a filler lens of Sample 7 was thereby formed.

Sample 8

A compound other than dipentaerythritol triacrylate was employed as an acrylic compound in a coating solution for an adhesive layer, and a filler lens of Sample 8 was formed in the same manner as Sample 7.

Sample 9

A coating solution, obtained by dispersing a mixture consisting of the composition below for 30 minutes using a sand mill, was coated on one surface of triacetyl cellulose (trade name: FUJI TAC) (triacetyl cellulose film) (produced by Fuji Photo Film Co., Ltd.) which is a transparent base material having a film thickness of 80 µm, and a transmittance of 92%, by a reverse coating method, and this was then dried for 2 minutes at 100° C. Subsequently, the film was exposed to UV radiation to cure the coating film, under the conditions of output powder: 120 W/cm; source distance: 10 cm; and exposure time: 30 seconds; using one converging type high-pressure mercury lamp. Thus, a filler lens of Sample 9 was formed as a comparative example of the present embodiment.

Composition of Coating Solution

Epoxy acrylic-type UV curable resin (trade name: KR-566; total solid concentration of 95%) (epoxy acrylic-type UV curable resin) (produced by Asahi Denka Kogyo K. K.;), 95 parts by weight Closslinked acrylic beads pigment (trade name: MX150; particle size of 1.5 µm±0.5) (closslinked acrylic beads pigment) (produced by Soken Chemistry Co., Ltd.), 10 parts by weight Isopropyl alcohol, 230 parts by weight Sample 10

The a coating solution for an adhesive layer of Sample 7 was changed to a coating solution consisting of the composition below and a UV curing process was omitted, a filler lens of Sample 10 was formed as a comparative example of the present embodiment, in the same manner as Sample 7.

Composition of Coating Solution for Adhesive Layer

Figure 10A:
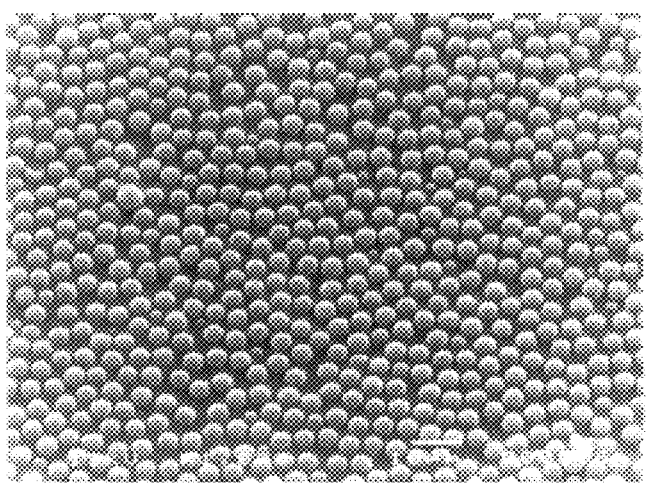
FIGS. 10A, 10B, and 10C show photomicrographs of a plane view of a filler lens of Sample 7 at magnifications of 1,000×, 2,000×, and 5,000×, respectively.
Figure 10B:
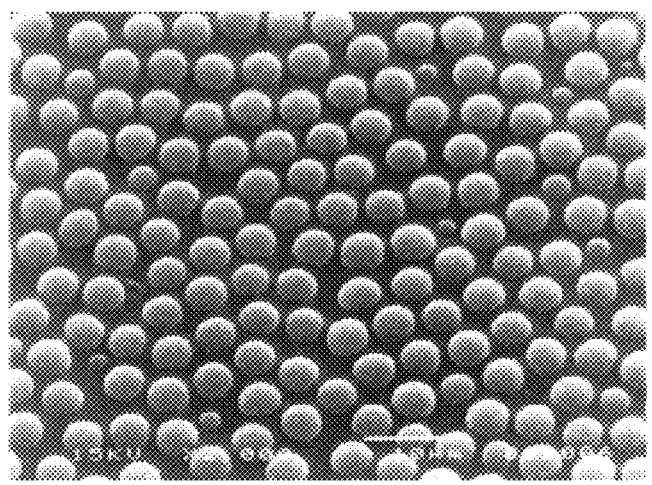
Figure 10C:
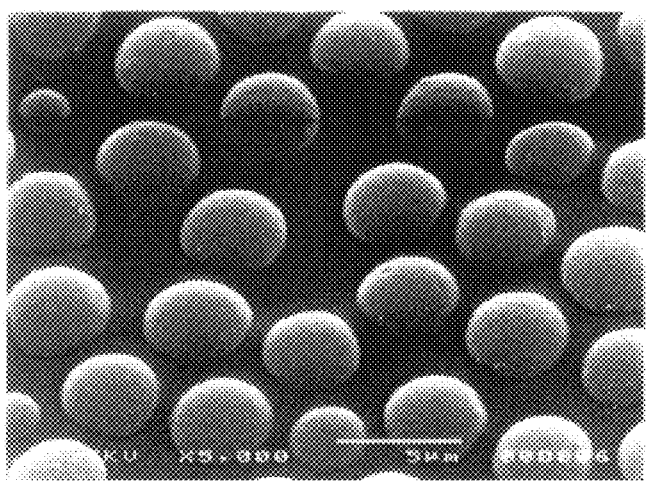
Figure 11A:
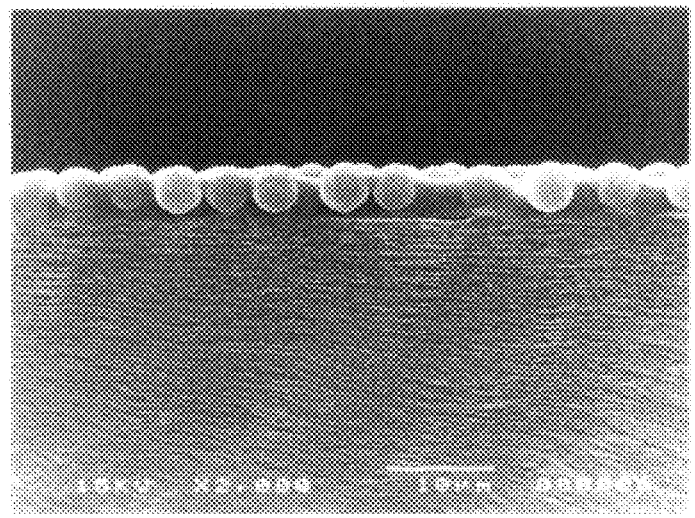
FIGS. 11A and 11B show photomicrographs of a cross section view of a filler lens of Sample 7 at magnifications of 2,000×, and 5,000×, respectively.
Figure 11B:
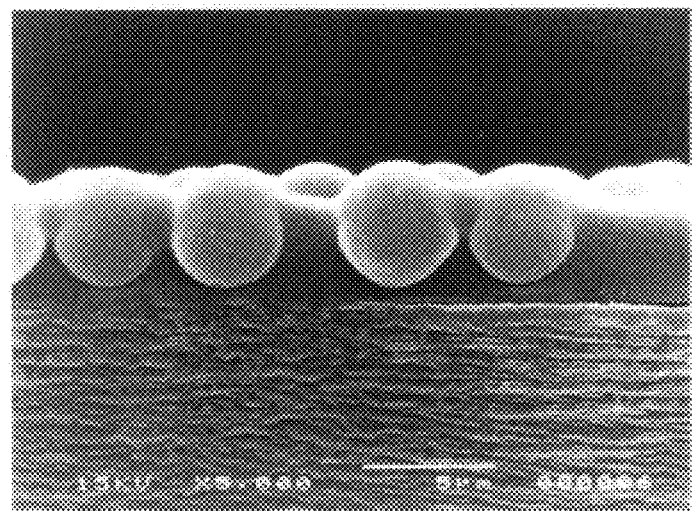
Figure 12A:
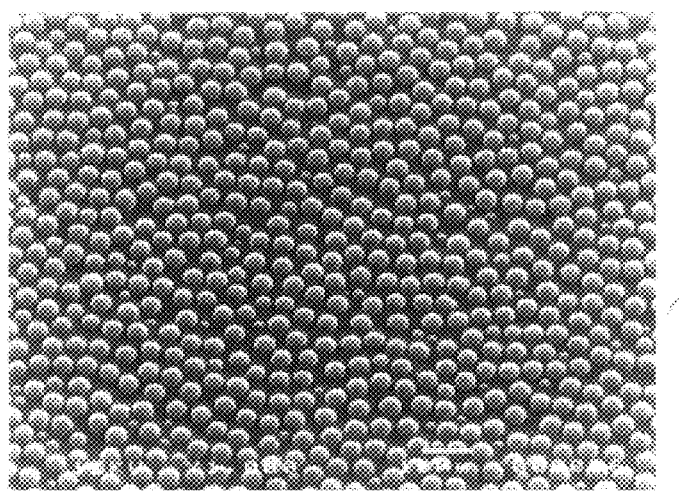
FIGS. 12A, 12B, and 12C show photomicrographs of a plane view of a filler lens of Sample 8 at magnifications of 1,000×, 2,000×, and 5,000×, respectively.
Figure 12B:
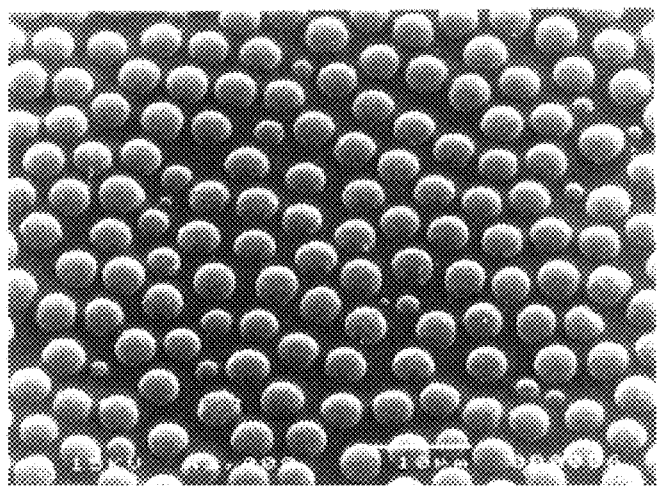
Figure 12C:
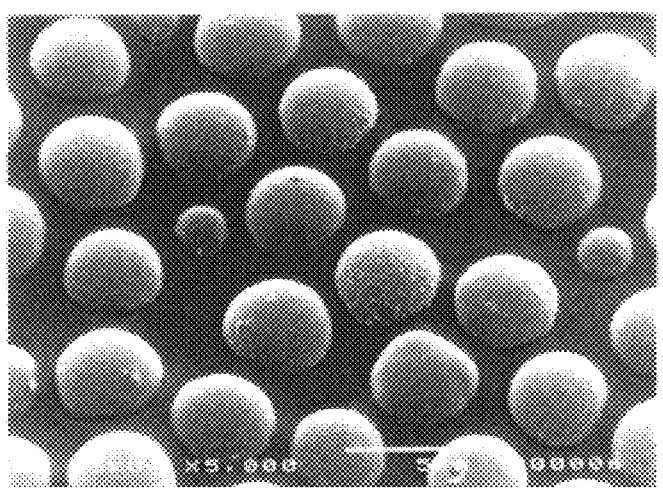
Figure 13A:
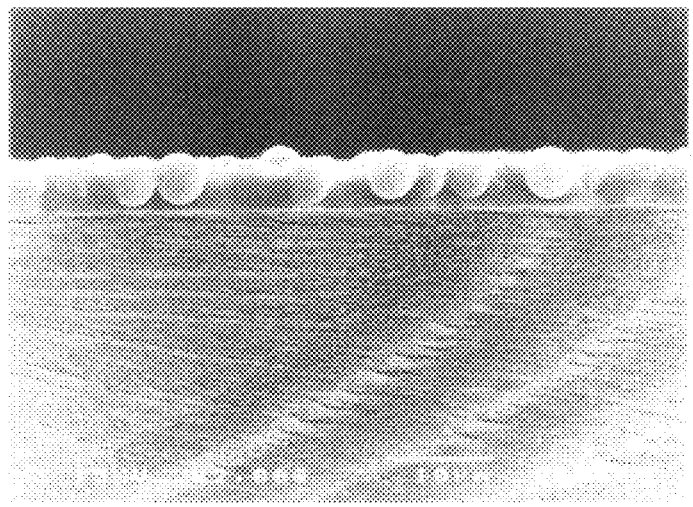
FIGS. 13A and 13B show photomicrographs of a cross section view of a filler lens of Sample 8 at magnifications of 2,000×, and 5,000×, respectively.
Figure 13B:
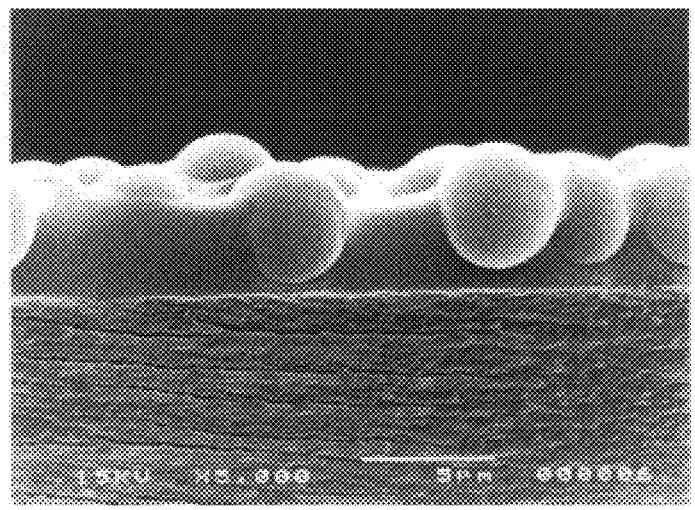

Acrylic-type adhesive (trade name: SK DAIN 811L; total solid concentration in ethylacetate of 23%) (acrylic-type adhesive) (produced by Soken Chemistry Co., Ltd.), 100 parts by weight Isocyanate-type hardener (trade name: D-90; total solid concentration in ethylacetate of 90%) (isocyanate-type hardener) (produced by Soken Chemistry Co., Ltd.), 1.5 parts by weight (2) Evaluation of Filler Lenses ① Observation of Filler Layer Plane views and cross section views of filler lenses of Samples 7 and 8 formed according to the above method were observed by an electron microscope. FIGS. 10A, 10B, and 10C show photomicrographs of a plane view of a filler lens of Sample 7 at magnifications of 1,000×, 2,000×, and 5,000×, respectively. FIGS. 11A and 11B show photomicrographs of a cross section view of a filler lens of Sample 7 at magnifications of 2,000× and 5,000×, respectively. FIGS. 12A, 12B, and 12C show photomicrographs of a plane view of a filler lens of Sample 8 at magnifications of 1,000×, 2,000×, and 5,000×, respectively. FIGS. 13A and 13B show photomicrographs of a cross section view of a filler lens of Sample 8 at magnifications of 2,000× and 5,000×, respectively. As is apparent from the plane photomicrographs, fillers had been uniformly dispersed at a high density in both filler lenses of Samples 7 and 8. In addition, as is apparent from the cross section photomicrographs, the fillers of Samples 7 and 8 uniformly protruded from the surface of the adhesive layer, so that the fillers were embedded at depths of about 70% and 60% of the diameters thereof, respectively, in the adhesive layer.

② Light Diffusivity Test

Figure 14A:
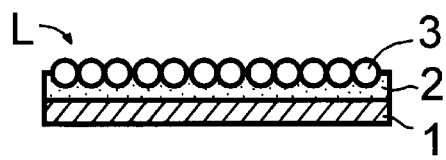
FIGS. 14A and 14B show diagrams of total light diffusion transmittance and total light diffusion reflectance for explaining light diffusivity to a filler lens, respectively.
Figure 14B:
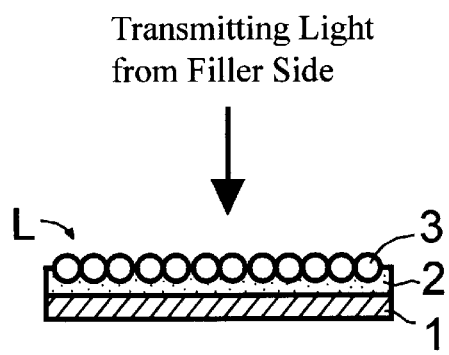

With respect to the above filler lenses of Samples 7 to 10, total light diffusion transmittance: T % and total light diffusion reflectance: R % in the cases in which the light was transmitted from the film 1 side as shown in FIG. 14A and in which the light was transmitted from the filler 3 side as shown in FIG. 14B, were measured by the integrating sphere equation using a spectrophotometer UV3100 produced by Shimadzu Corporation.

Figure 15A:
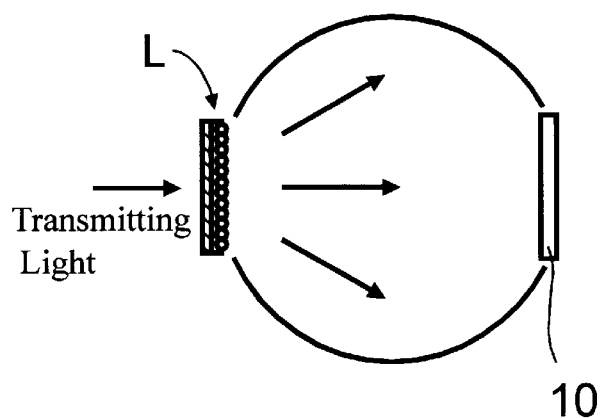
FIGS. 15A and 15B show diagrams of measuring methods of total light diffusion transmittance and total light diffusion reflectance for explaining a measuring method of light diffusivity, respectively.
Figure 15B:
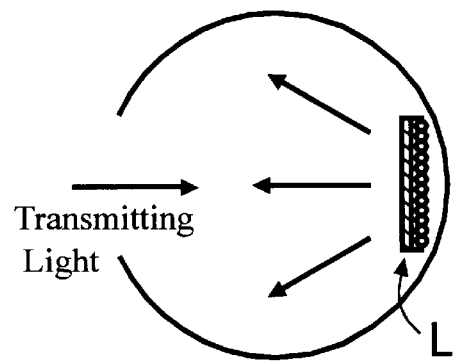

As a measuring method of total light diffusion transmittance: T %, a filler lens is placed between incident light and a standard white board (magnesium sulfate) 10 as shown in FIG. 15A and then the total light diffusion transmittance of light diffused forward is measured. FIG. 15B shows the case in which light is transmitted from the film side as shown in FIG. 14A; however, also with respect to the case in which light is transmitted from the filler side as shown in FIG. 14B, total light diffusion transmittance was measured in the same way.

Furthermore, as a measuring method of total light diffusion reflectance: R %, first, light is transmitted on a standard white board (magnesium sulfate), then, total light diffusion reflectance of light diffused backward is measured, and the measured value is defined as 100. Secondly, total light diffusion reflectance thereof is measured by emitting light to a filler lens L as shown in FIG. 15B and then, it is calculated as a ratio of the total light diffusion reflectance of the above standard white board. FIG. 15B shows the case in which light is transmitted from the film side as shown in FIG. 14A; however, also with respect to the case in which light is transmitted from the filler side as shown in FIG. 14B, total light diffusion reflectance was measured in the same way. In this case, the measuring wavelength was in a range of 400 to 700 nm, and the measured value is shown by the average value in this wavelength range.

Next, filler lenses of the above Samples 7 to 10 were left under high-temperatures and high-humidity conditions (80° C., 90%) for 3 days, subsequently, light-diffusivity was tested as described above, and high-temperature and high-humidity resistance, that is, reliability under high-temperatures and high-humidity was evaluated.

③ Evaluation of Adhesion

Adhesion thereof was measured according to Japanese Industrial Standard Z-0237, using adhesive layers (a thickness of 10 μm after drying) in which each coating solution for adhesive layers of the above Samples 7 to 10 was coated on a PET film and was dried. Each adhesion thereof before curing and after curing (same curing conditions as Sample 7) was evaluated.

These results are shown in Table 1.

the lens effect of fillers is sufficiently obtained since fillers are embedded on a surface of an adhesive layer so that part of the filler protrudes from a surface of the adhesive layer and in which the optical properties are maintained even under high-temperatures and high humidity since the adhesive in the adhesive layer is cured.

TABLE 1

|  | Before Leaving under High Temperature and High Humidity | | | | After Leaving under High Temperature and High Humidity | | | | Adhesion | |
| --- | --- | --- | --- | --- | --- | --- | --- | --- | --- | --- |
|  | Light Transmitting from Film side | | Light Transmitting from Filler Side | | Light Transmitting from Film Side | | Light Transmitting from Filler Side | | (g/25 mm) | |
|  | T % | R % | T % | R % | T % | R % | T % | R % | Before Curing | After Curing |
| Sample 7 | 70.8 | 44.1 | 99.6 | 25.2 | 70.4 | 43.9 | 99.3 | 25.6 | 250 | 10 |
| Sample 8 | 64.3 | 43.5 | 96.7 | 27.0 | 64.0 | 43.5 | 96.6 | 26.7 | 220 | 10 |
| Sample 9 | 91.3 | 26.7 | 91.4 | 26.5 | 91.1 | 26.2 | 91.4 | 26.3 | 20 | 0 |
| Sample 10 | 73.2 | 41.9 | 94.5 | 25.8 | 79.8 | 31.6 | 92.8 | 25.6 | 900 | 400 |

As shown in Table 1, in Sample 9 in which fillers were dispersed in resin, in the case in which light was transmitted from either film side or filler side, total light diffusion transmittance was about 91% and total light diffusion reflectance was about 26%, and there was no difference. In contrast, with respect to light-diffusivities of Samples 7, 8, and 10, there were differences between light transmitting directions from the film side and from the filler side. In the case in which light was transmitted from the film side, total light diffusion transmittance was lower than in Sample 9 and total light diffusion reflectance was higher. In contrast, in the case in which light was transmitted from the filler side, total light diffusion transmittance was extremely high and total light diffusion reflectance was low.

In addition, after being left under high-temperature and high humidity conditions, with respect to light-diffusivity of Samples 7 to 9, there were slight differences; however, with respect Sample 10 in which adhesive in the adhesive layer had not cured, total light diffusion transmittance was increased and total light diffusion reflectance was decreased. That is, according to a production method of the present invention, a filler lens can be obtained, in which a lens effect in which light-diffusivities are different depending on the light transmitting direction can be obtained, and in which specific light-diffusivities can be maintained even if it is left under high-temperatures and high humidity.

Figure 16A:
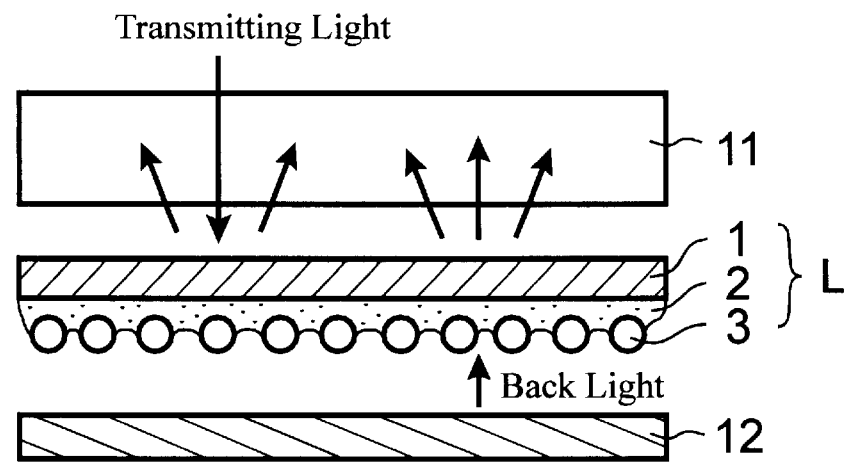
FIGS. 16A and 16B show sectional schematic views of examples in which a filler lens of the present invention is applied to a liquid crystal display.
Figure 16B:
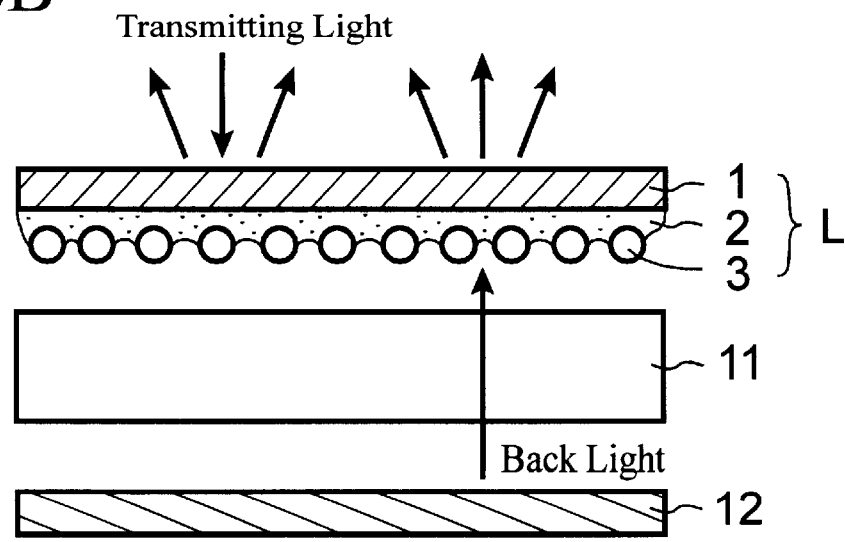
Figure 17:
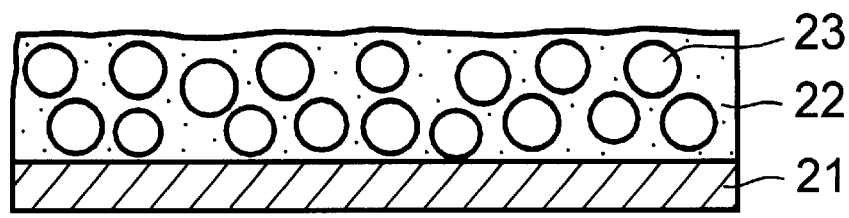
FIG. 17 shows a sectional schematic view of an example of a conventional filler lens.

Specifically, in the case in which the filler lens is used for a transmission-type liquid crystal display, a film 1 comprising a filler lens L according to the present invention is placed, as a light diffusion plate, between a liquid crystal panel 11 and a back light 12 as shown in FIG. 16A so as to face the liquid crystal panel 11 side. Light transmittance of the back light 12 is thereby very high, and in addition, sunlight or fluorescent light transmitted from the front side (upper side in the figure) of the display is easily reflected. Therefore, the quantity of light which illuminates the liquid crystal panel 11 is increased very much, and clarifying and power-saving effects for the liquid crystal images can be obtained. Furthermore, when a film 1 is placed at the front side of the liquid crystal panel 11 so as to face forward, as shown in FIG. 16B, the filler lens can be used as a light diffusion lens in which the viewing angle is very wide, since transmittance of the back light 12 is high.

As explained above, according to the present invention, a production method for a filler lens can be provided in which

What is claimed is:

1. A method for forming a monolayer powder film in which an adhesive layer is provided on a base material directly or on said base material indirectly through another layer and in which powders are embedded on a surface of said adhesive layer so that part of said powders protrude from said surface of said adhesive layer, comprising:

Forming said adhesive layer having a weight average molecular weight of 250,000 or more on said base material directly or on said base material indirectly through another layer, adhering said powders to said surface of said adhesive layer, embedding said powders as a monolayer on said surface of said adhesive layer by impacts of granular pressure media so as to form a laminate, and removing surplus powders adhered to the laminate so as to form said monolayer powder film.

2. The method for forming the monolayer powder film as recited in claim 1, wherein said adhesive layer contains acrylic adhesive.

3. The method for forming the monolayer powder film as recited in claim 1, wherein said pressure media are globules having a diameter of 0.1 to 3.0 mm, and said powders are struck by impacts due to vibrations of said pressure media so as to embed said powders in said adhesive layer.

4. The method for forming the monolayer powder film as recited in claim 1, wherein said removal of surplus powders is a process in which wet washing is carried out on said laminate using water or an aqueous solution to which is added a washing auxiliary agent, and then said laminate is dried.

5. The method for forming the monolayer powder film as recited in claim 1, wherein said adhering of powders is a process in which said powders are fluidized by fluid pressure of air, said base material is passed thereunder, and said powders are thereby adhered to said surface of said adhesive layer.

6. The method for forming the monolayer powder film as recited in claim 1, wherein said adhering of powders is a process in which said powders are adhered to said surface of said adhesive layer by air spraying.

7. The method for forming the monolayer powder film as recited in claim 1, wherein said powders are adhered thereto, after said adhesive layer consisting of at least adhesive and hardener is formed and then is cured.

8. The method for forming the monolayer powder film as recited in claim 7, wherein said adhesive layer is cured after a separate film is laminated on said adhesive layer.

9. The method for forming the monolayer powder film as recited in claim 1, wherein said base material is a film shape or a sheet shape, and said adhesive layer is coated by a coater.

10. The method for forming the monolayer powder film as recited in claim 1, wherein said adhesive layer has a glass transition point of −55 to −30° C.

11. The method for forming the monolayer powder film as recited in claim 1, wherein said powders have a particle size distribution of 0.8 to 1.0.

12. The method for forming the monolayer powder film as recited in claim 1, wherein said powders have a roundness of 80% or more.

13. A production method for a filler lens comprising a base material, an adhesive layer provided on said base material directly or on said base material indirectly through another layer, consisting of at least radiation-curable resin, a filler layer in which fillers are embedded on a surface of said adhesive layer so that part of said filler protrudes from said surface of said adhesive layer, comprising:

forming said adhesive layer on said base material directly or on said base material indirectly through another layer, embedding said fillers as a monolayer on said surface of said adhesive layer by striking said filler using an external force via pressure media so as to form a laminate, curing said adhesive layer, and removing surplus powders adhered to said laminate.

14. The production method for the filler lens as recited in claim 13, wherein said pressure media are granular.

15. The production method for the filler lens as recited in claim 13, wherein said filler is embedded to said adhesive layer to a depth of 10 to 90% of the diameter thereof.

* * * * *